April 29, 1952 F. J. SCUDDER 2,595,106

RECORDING TELEPHONE SYSTEM

Filed June 18, 1947 32 Sheets-Sheet 1

INVENTOR
F. J. SCUDDER
BY R. Mariano
ATTORNEY

INVENTOR
F. J. SCUDDER
BY R. Marino
ATTORNEY

April 29, 1952 F. J. SCUDDER 2,595,106

RECORDING TELEPHONE SYSTEM

Filed June 18, 1947 32 Sheets-Sheet 3

INVENTOR
F. J. SCUDDER
BY R. Mariner
ATTORNEY

INVENTOR
F. J. SCUDDER
BY R. Marino
ATTORNEY

April 29, 1952 F. J. SCUDDER 2,595,106

RECORDING TELEPHONE SYSTEM

Filed June 18, 1947 32 Sheets-Sheet 5

INVENTOR
F. J. SCUDDER

BY

R. Marino

ATTORNEY

April 29, 1952 F. J. SCUDDER 2,595,106

RECORDING TELEPHONE SYSTEM

Filed June 18, 1947 32 Sheets-Sheet 6

INVENTOR
F. J. SCUDDER
BY R. Marino
ATTORNEY

INVENTOR
F. J. SCUDDER
BY R. Mariano
ATTORNEY

INVENTOR
F. J. SCUDDER
BY R. Marino
ATTORNEY

April 29, 1952 F. J. SCUDDER 2,595,106

RECORDING TELEPHONE SYSTEM

Filed June 18, 1947 32 Sheets-Sheet 9

INVENTOR
F. J. SCUDDER
BY R. Marino
ATTORNEY

April 29, 1952 F. J. SCUDDER 2,595,106

RECORDING TELEPHONE SYSTEM

Filed June 18, 1947 32 Sheets-Sheet 10

INVENTOR
F. J. SCUDDER
BY R. Marino
ATTORNEY

April 29, 1952 F. J. SCUDDER 2,595,106

RECORDING TELEPHONE SYSTEM

Filed June 18, 1947

32 Sheets-Sheet 11

INVENTOR
F. J. SCUDDER
BY R. Marino
ATTORNEY

INVENTOR
F. J. SCUDDER
BY R. Marino
ATTORNEY

April 29, 1952 F. J. SCUDDER 2,595,106

RECORDING TELEPHONE SYSTEM

Filed June 18, 1947 32 Sheets-Sheet 13

INVENTOR
F. J. SCUDDER
BY R. Marino
ATTORNEY

April 29, 1952 F. J. SCUDDER 2,595,106

RECORDING TELEPHONE SYSTEM

Filed June 18, 1947 32 Sheets-Sheet 14

INVENTOR
F. J. SCUDDER
BY R. Marino
ATTORNEY

INVENTOR
F. J. SCUDDER
BY R. Marino
ATTORNEY

April 29, 1952    F. J. SCUDDER    2,595,106

RECORDING TELEPHONE SYSTEM

Filed June 18, 1947    32 Sheets-Sheet 16

INVENTOR
F. J. SCUDDER
BY R. Mauro
ATTORNEY

April 29, 1952 F. J. SCUDDER 2,595,106

RECORDING TELEPHONE SYSTEM

Filed June 18, 1947 32 Sheets-Sheet 17

INVENTOR
F. J. SCUDDER
BY R. Mallicoat
ATTORNEY

April 29, 1952 F. J. SCUDDER 2,595,106

RECORDING TELEPHONE SYSTEM

Filed June 18, 1947 32 Sheets-Sheet 18

INVENTOR
F. J. SCUDDER
BY R. Marino
ATTORNEY

April 29, 1952 F. J. SCUDDER 2,595,106

RECORDING TELEPHONE SYSTEM

Filed June 18, 1947 32 Sheets-Sheet 19

INVENTOR
F. J. SCUDDER
BY R. Marino
ATTORNEY

April 29, 1952 F. J. SCUDDER 2,595,106

RECORDING TELEPHONE SYSTEM

Filed June 18, 1947 32 Sheets-Sheet 20

INVENTOR
F. J. SCUDDER
BY R. Marino
ATTORNEY

April 29, 1952 F. J. SCUDDER 2,595,106

RECORDING TELEPHONE SYSTEM

Filed June 18, 1947 32 Sheets-Sheet 21

INVENTOR
F. J. SCUDDER
BY R. Marino
ATTORNEY

INVENTOR
F. J. SCUDDER
BY
R. Mario
ATTORNEY

April 29, 1952 F. J. SCUDDER 2,595,106

RECORDING TELEPHONE SYSTEM

Filed June 18, 1947 32 Sheets-Sheet 23

INVENTOR
F. J. SCUDDER
BY R. Mason
ATTORNEY

April 29, 1952 F. J. SCUDDER 2,595,106

RECORDING TELEPHONE SYSTEM

Filed June 18, 1947 32 Sheets-Sheet 24

INVENTOR
F. J. SCUDDER
BY R. Marino
ATTORNEY

INVENTOR
F. J. SCUDDER
BY R. Marino
ATTORNEY

INVENTOR
F. J. SCUDDER
BY R. Marino
ATTORNEY

INVENTOR
F. J. SCUDDER
BY R. Marino
ATTORNEY

April 29, 1952 F. J. SCUDDER 2,595,106

RECORDING TELEPHONE SYSTEM

Filed June 18, 1947 32 Sheets-Sheet 28

INVENTOR
F. J. SCUDDER
BY
R. Marino
ATTORNEY

April 29, 1952 F. J. SCUDDER 2,595,106

RECORDING TELEPHONE SYSTEM

Filed June 18, 1947 32 Sheets-Sheet 29

INVENTOR
F. J. SCUDDER
BY R. Marino
ATTORNEY

April 29, 1952 F. J. SCUDDER 2,595,106

RECORDING TELEPHONE SYSTEM

Filed June 18, 1947 32 Sheets-Sheet 30

INVENTOR
F.J. SCUDDER
BY R. Mario
ATTORNEY

April 29, 1952 F. J. SCUDDER 2,595,106

RECORDING TELEPHONE SYSTEM

Filed June 18, 1947 32 Sheets-Sheet 31

INVENTOR
F. J. SCUDDER
BY
R. Marino
ATTORNEY

April 29, 1952 F. J. SCUDDER 2,595,106

RECORDING TELEPHONE SYSTEM

Filed June 18, 1947 32 Sheets-Sheet 32

INVENTOR
F. J. SCUDDER
BY R. Mariño
ATTORNEY

Patented Apr. 29, 1952 2,595,106

UNITED STATES PATENT OFFICE 2,595,106

RECORDING TELEPHONE SYSTEM

Frederick J. Scudder, Manhasset, N. Y., assignor to Bell Telephone Laboratories, Incorporated, New York, N. Y., a corporation of New York Application June 18, 1947, Serial No. 755,434

2 Claims. (Cl. 179—7.1)

This invention pertains to telephone systems and more especially to systems in which records are automatically made of information relating to calls for which subscribers are to be charged. It is particularly applicable to systems employing equipment of the step-by-step type.

The copending application of J. W. Gooderham, Serial No. 448,782 filed June 27, 1942, discloses a system in which records relating to telephone connections are made on recording devices individual to the trunks over which said connections are established. In accordance with the present invention, records of connections made over a plurality of trunks are made on a continuous medium by a single recording device common to said trunks. Since several entries made at different times are required to record the necessary information in regard to each completed connection, it follows that entries relating to various connections are interspersed on the recording medium and a means of indentifying the entries is necessary so that the entries relating to each connection may be assembled. A feature of the present invention is a means of recording in each entry the designation of the trunk involved in the connection to which the entry relates, said recorded designation permitting the various entries of each connection to be identified.

Other features of the invention are a means of recording information in regard to the calling line directly from an identifier by which said information is obtained, and means for periodically recording on the continuous medium indications of current time by which the times when the various entries were made may be determined.

These and other features of the invention will be more readily understood from the following description, the appended claims, and the accompanying drawings, in which:

Figure 33:
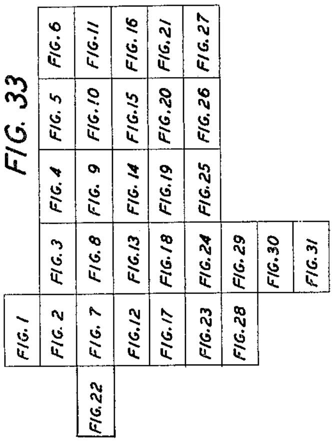
Figure 1:
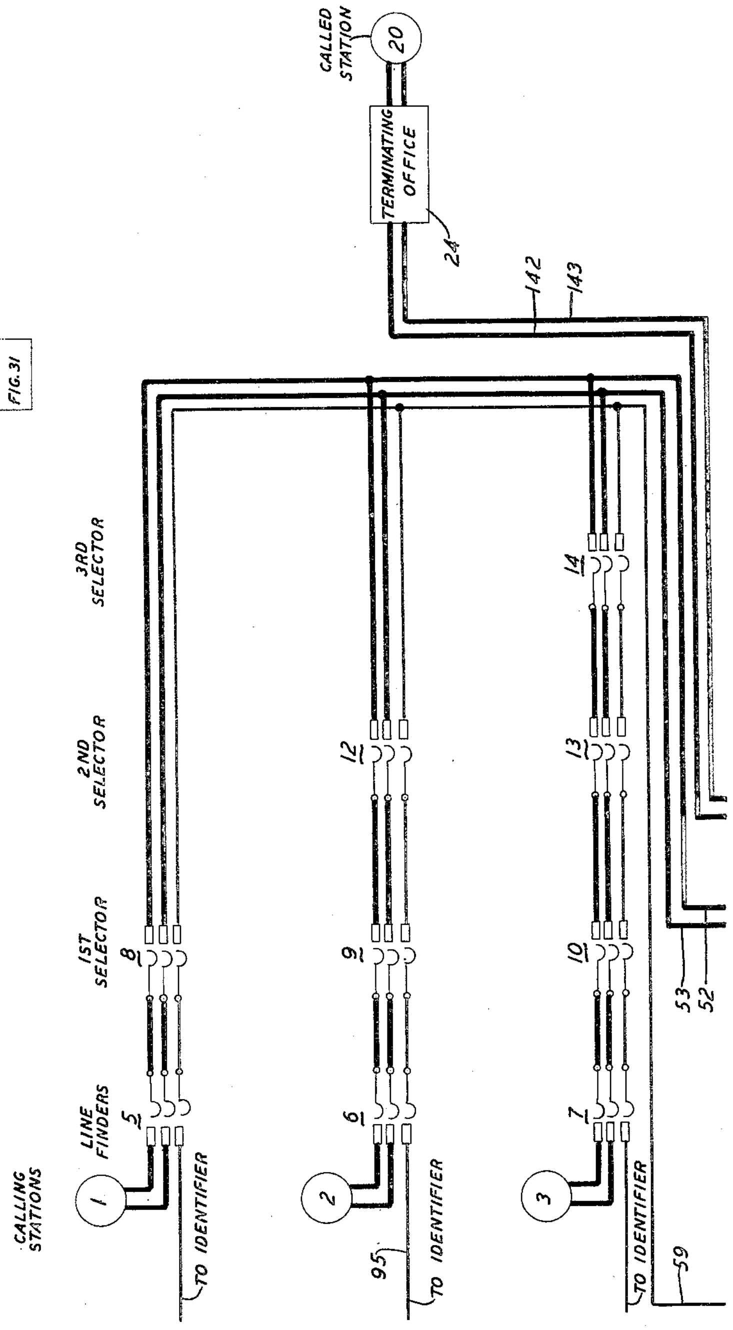
Fig. 1 shows schematically calling stations, selector switches for extending the lines of said stations, a terminating office, and a called station.
Figure 12:
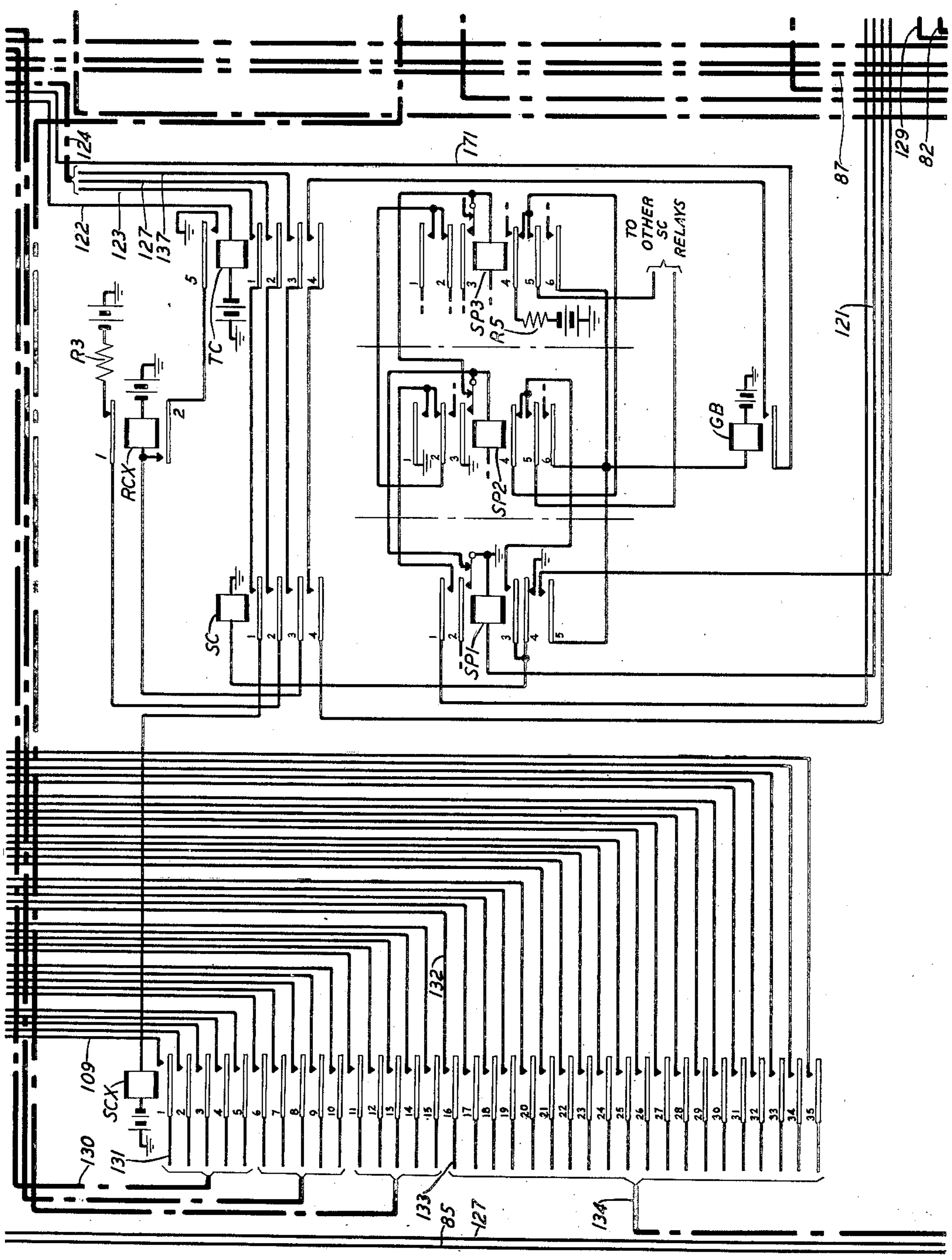
Figure 13:
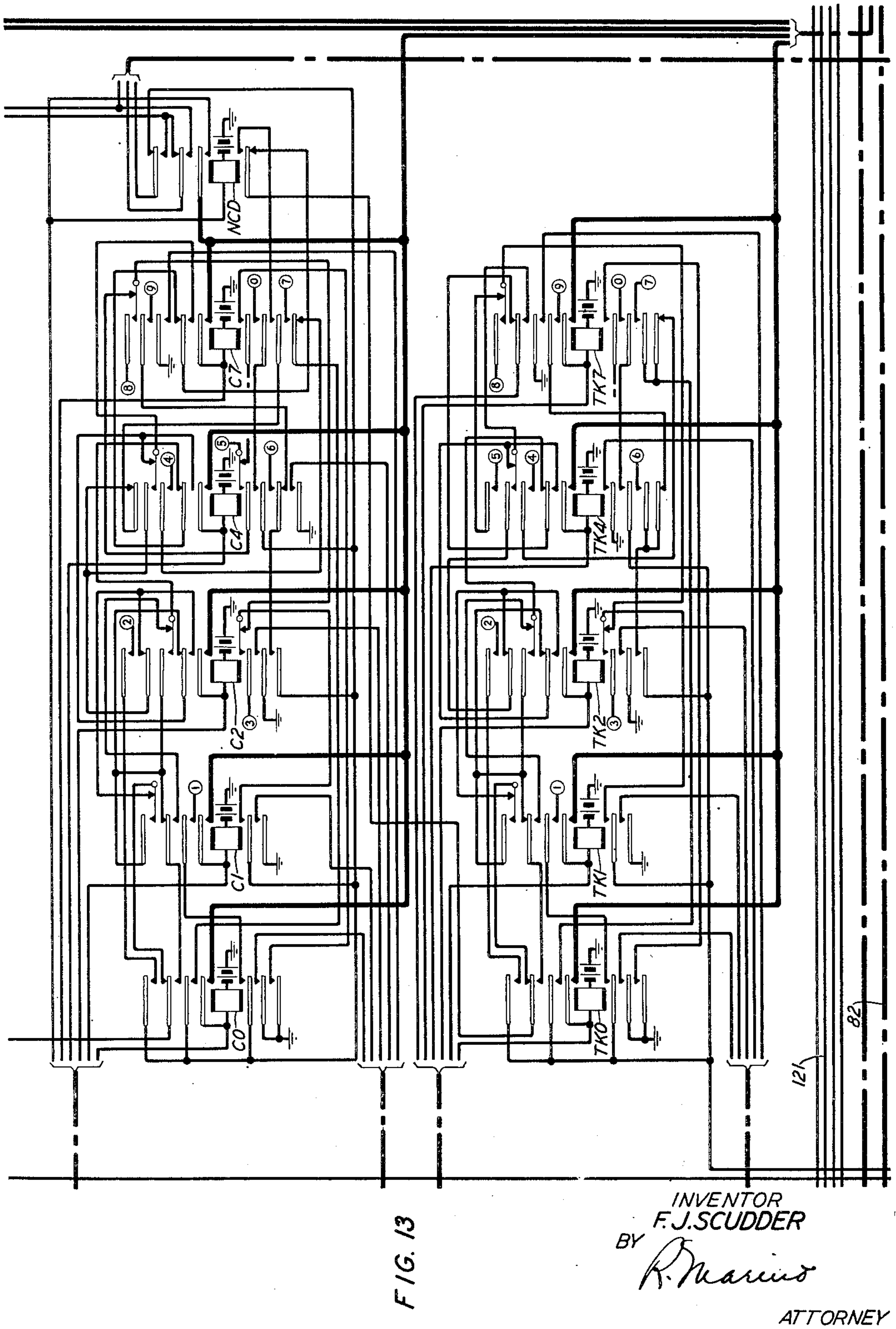
Figure 14:
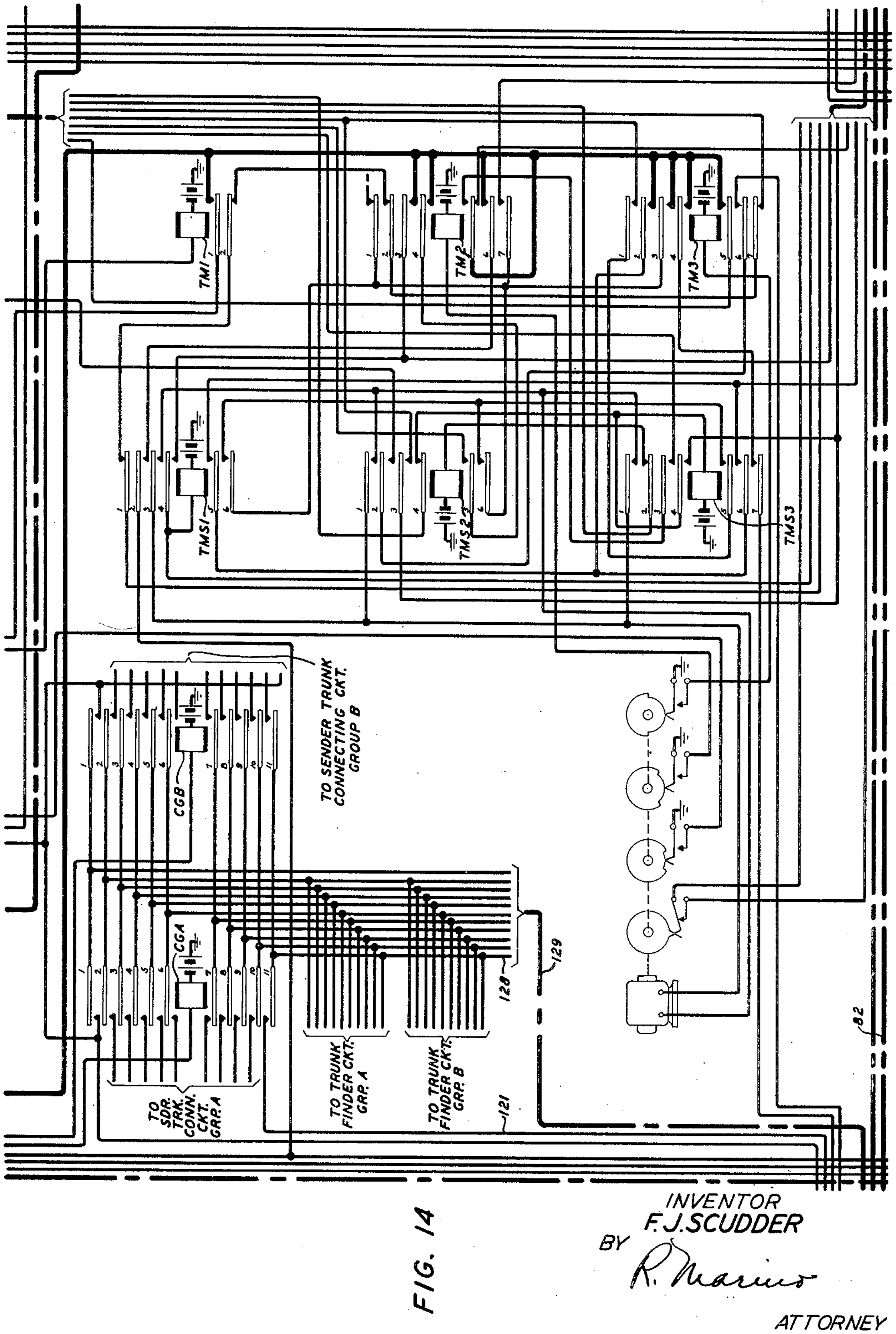
Figure 15:
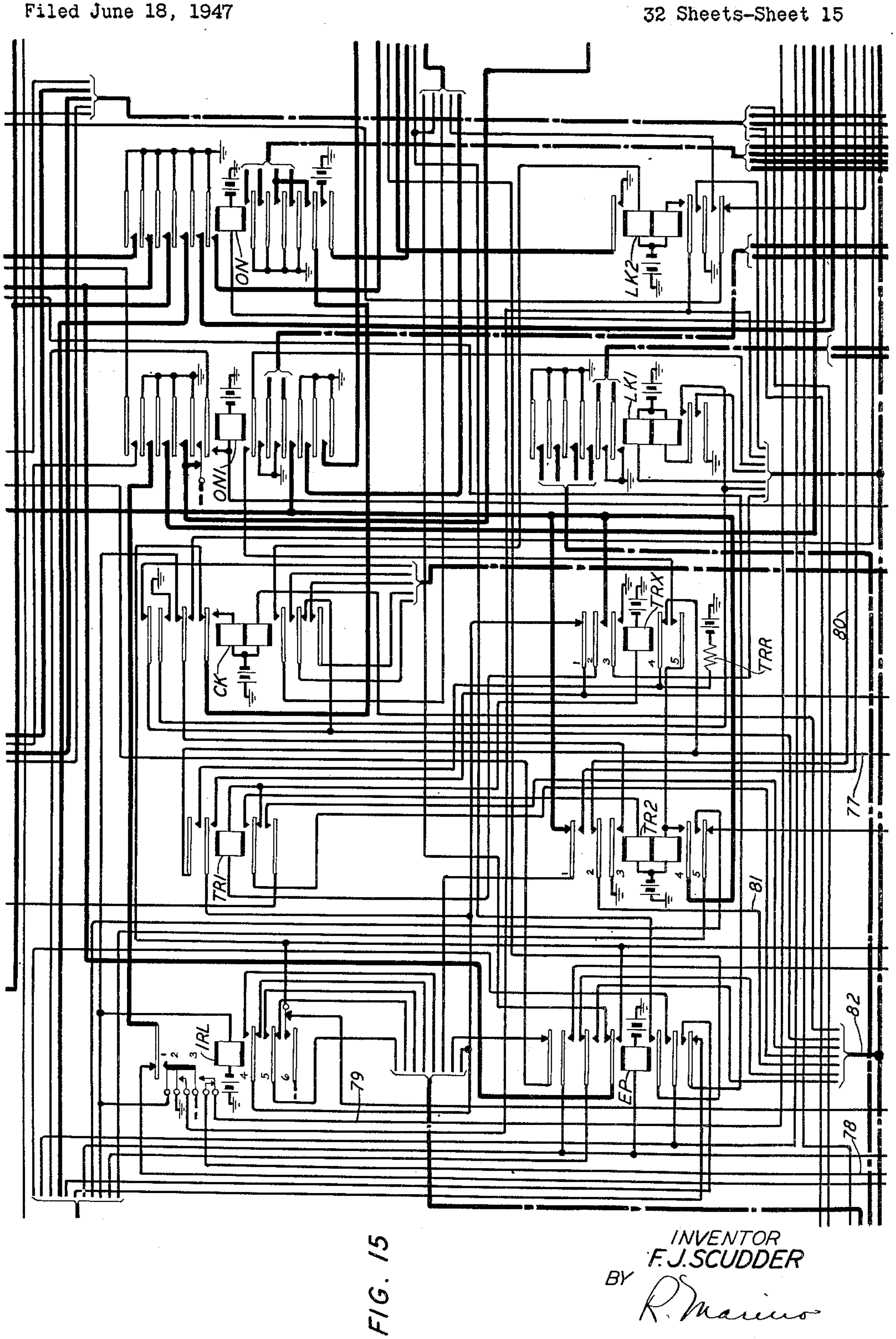
Figure 16:
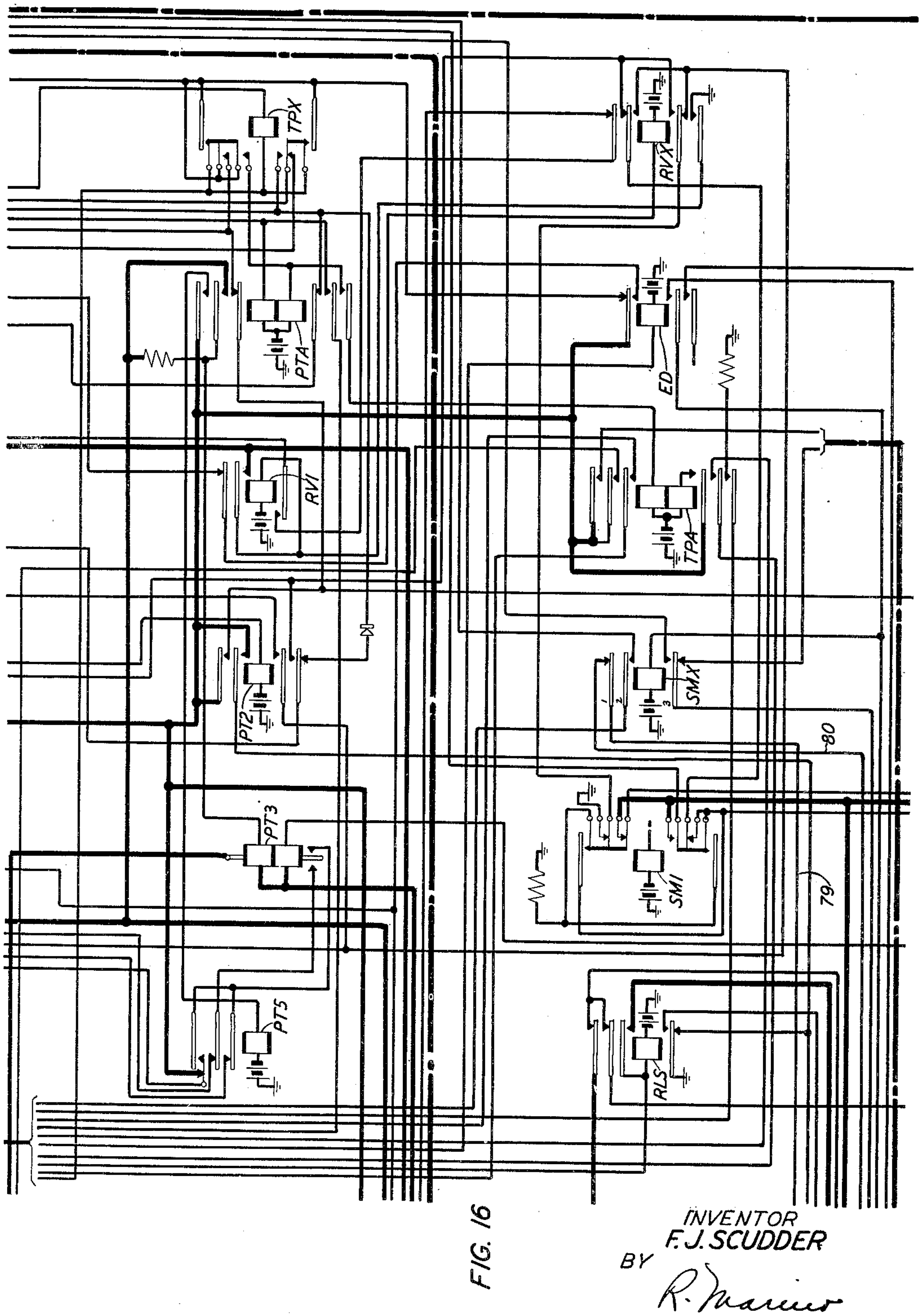
Figure 17:
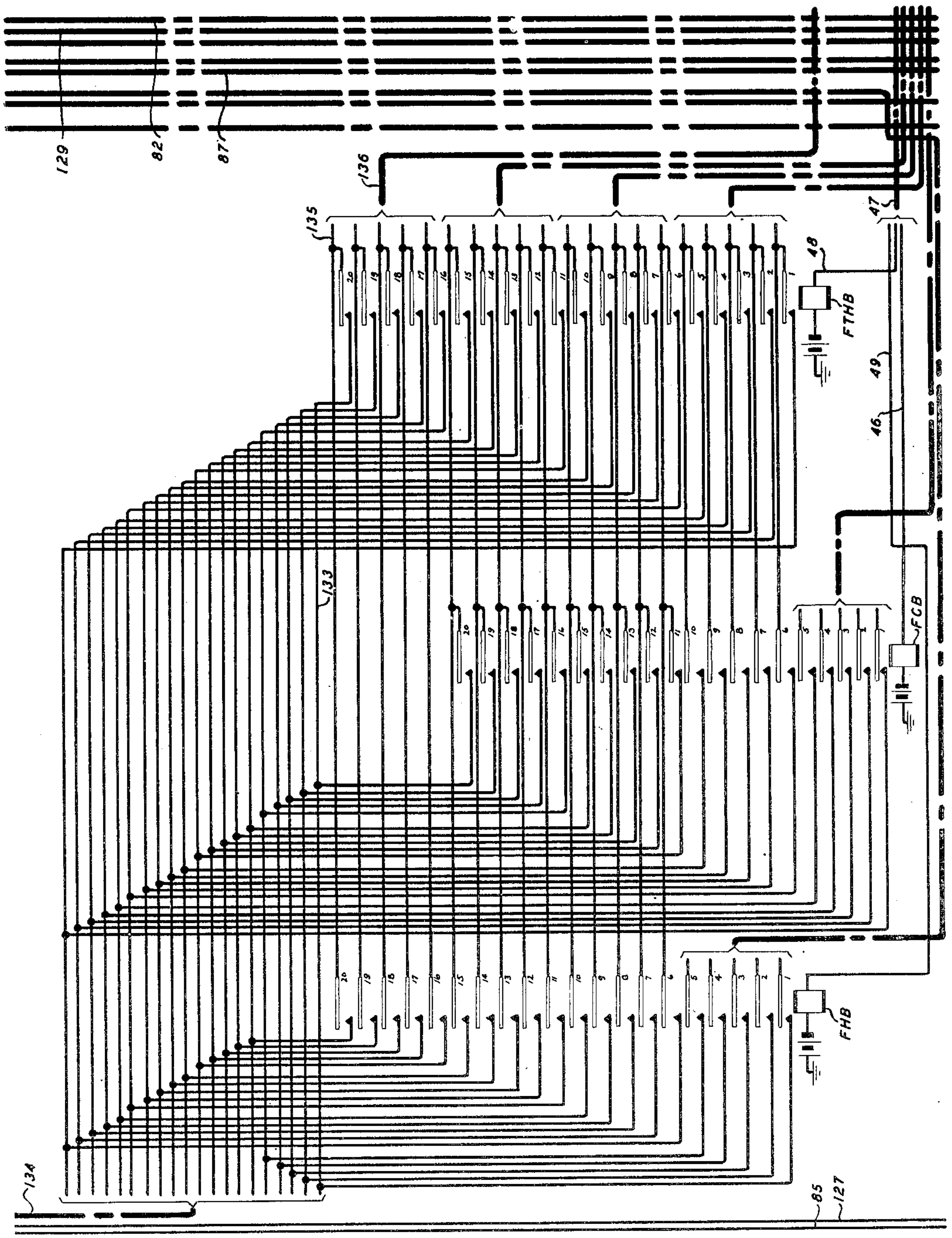
Figure 18:
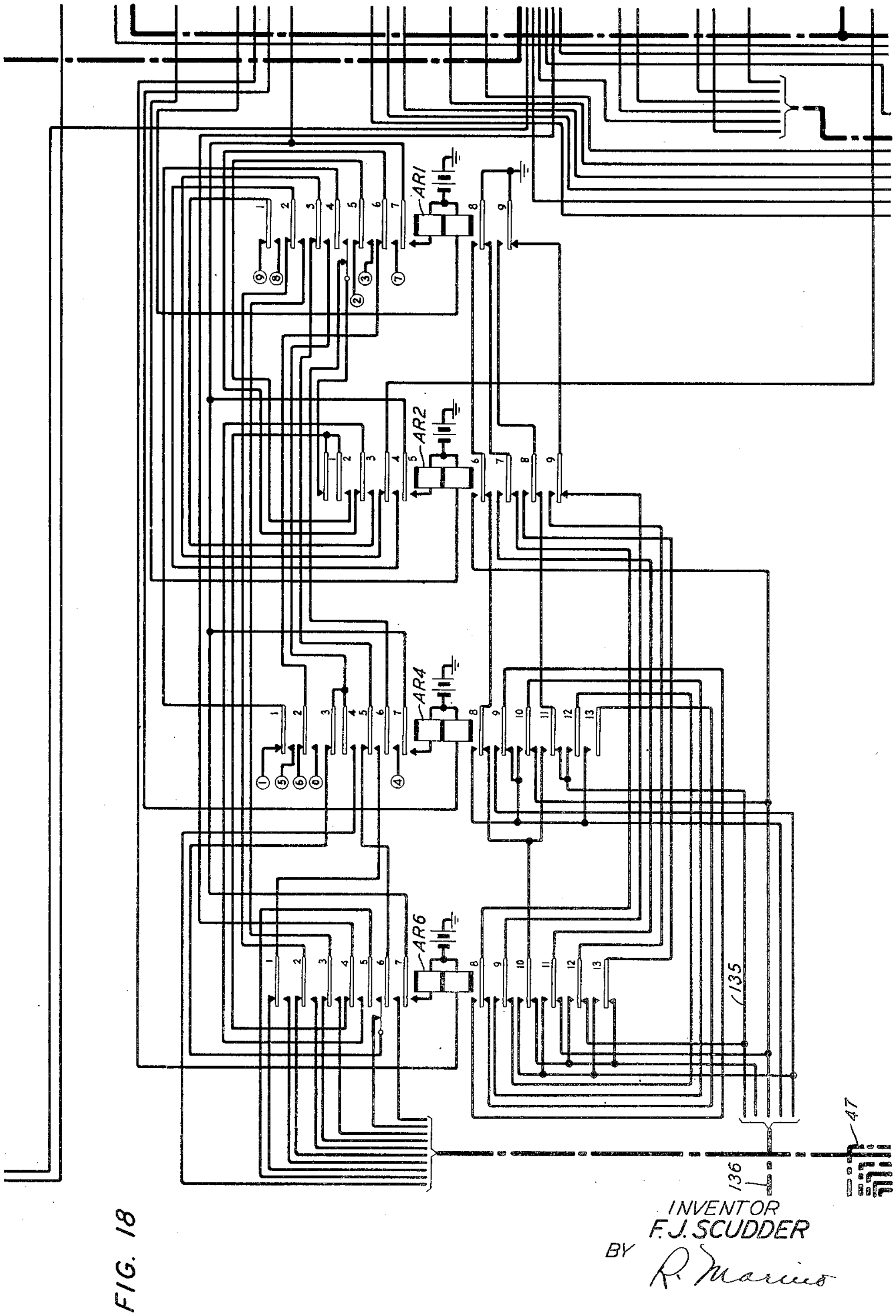
Figure 19:
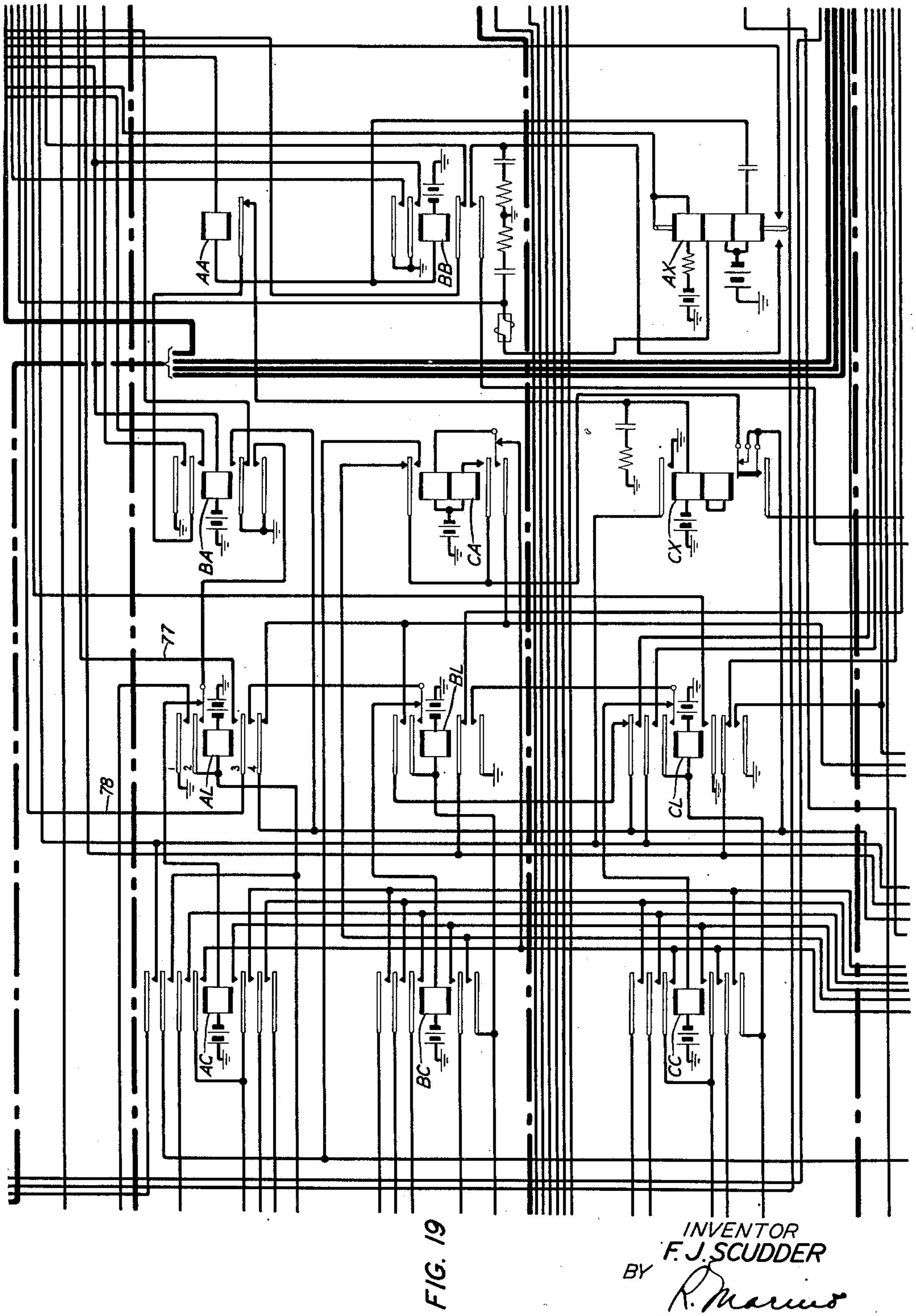
Figure 20:
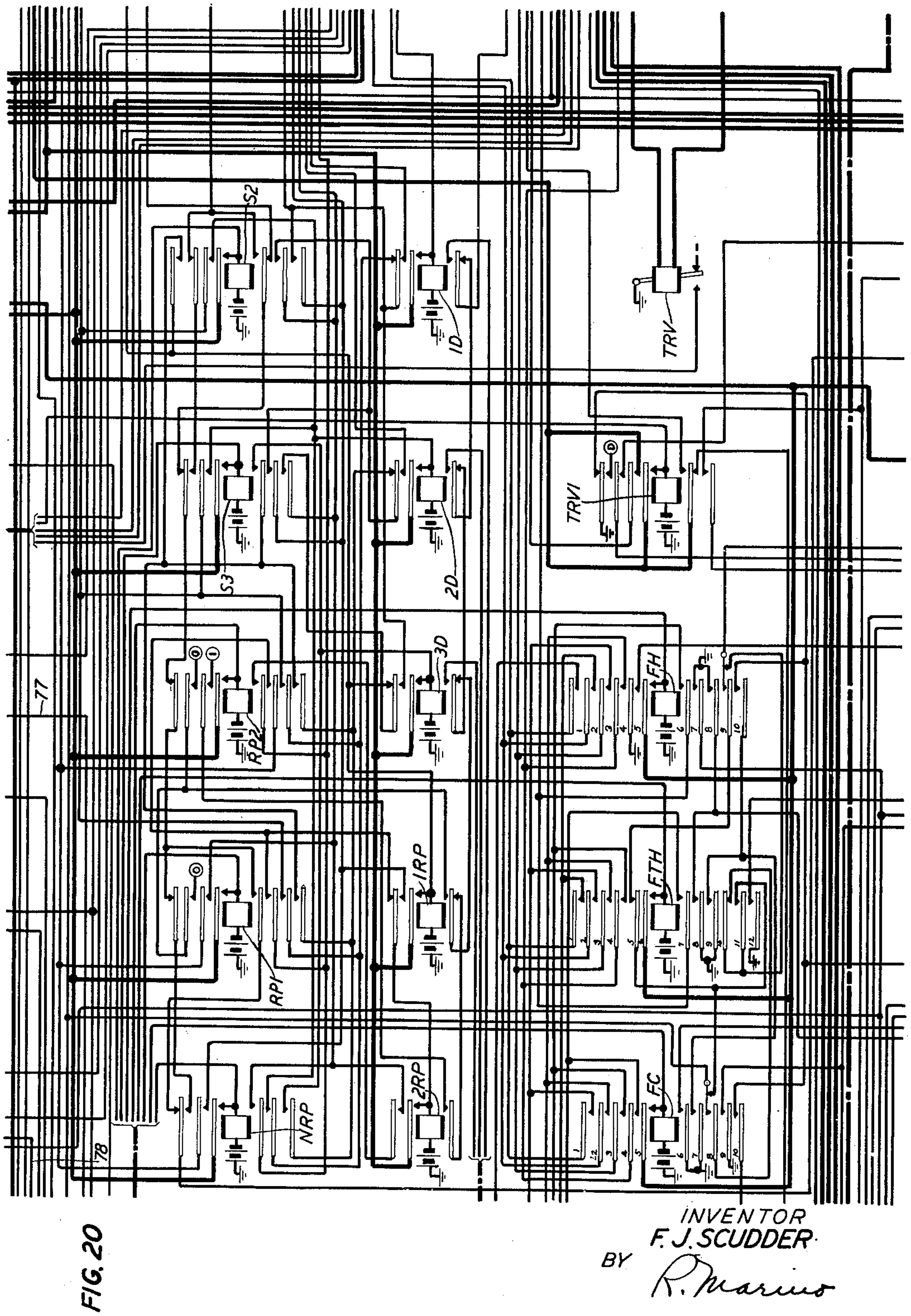
Figure 21:
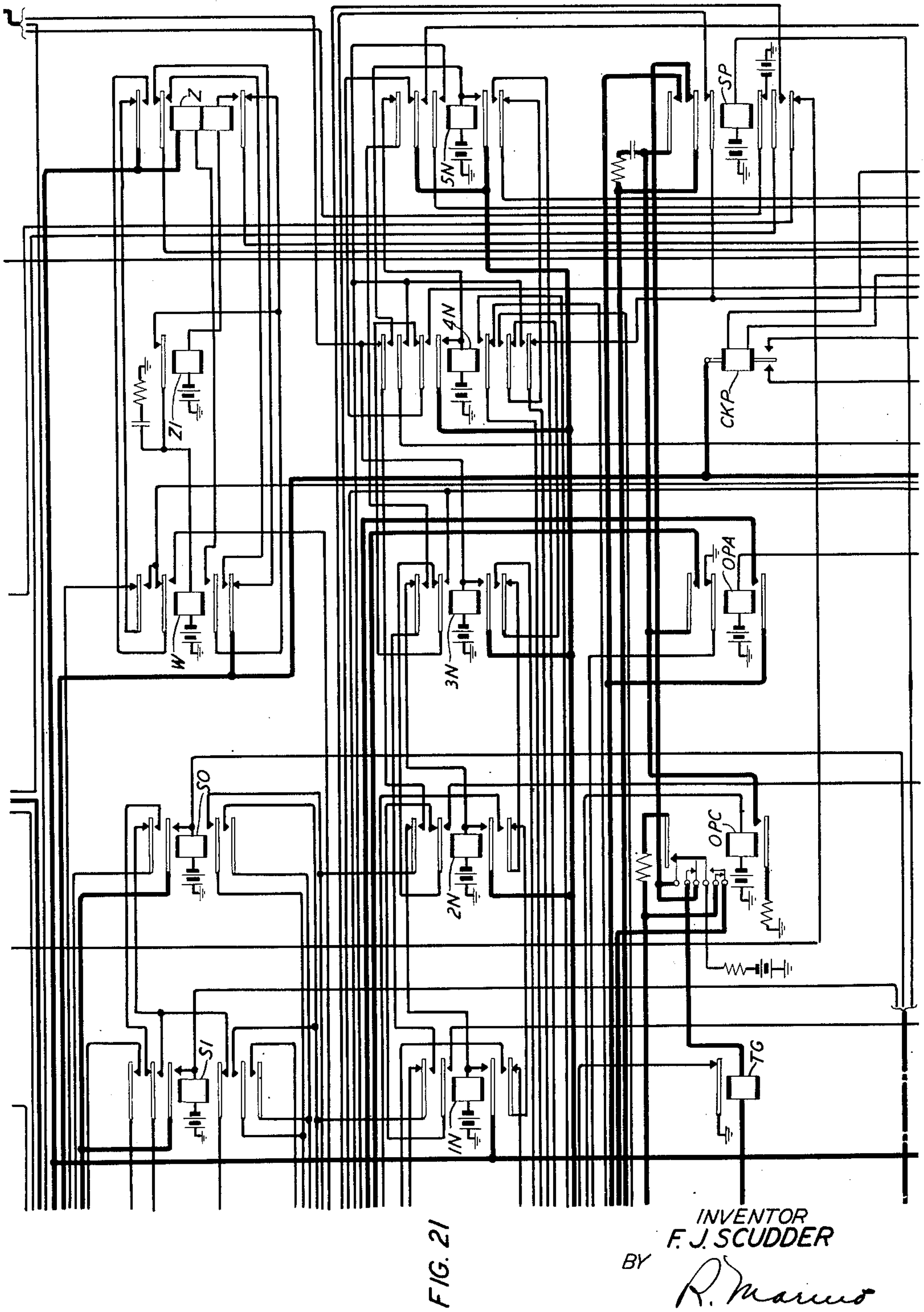
Figure 22:
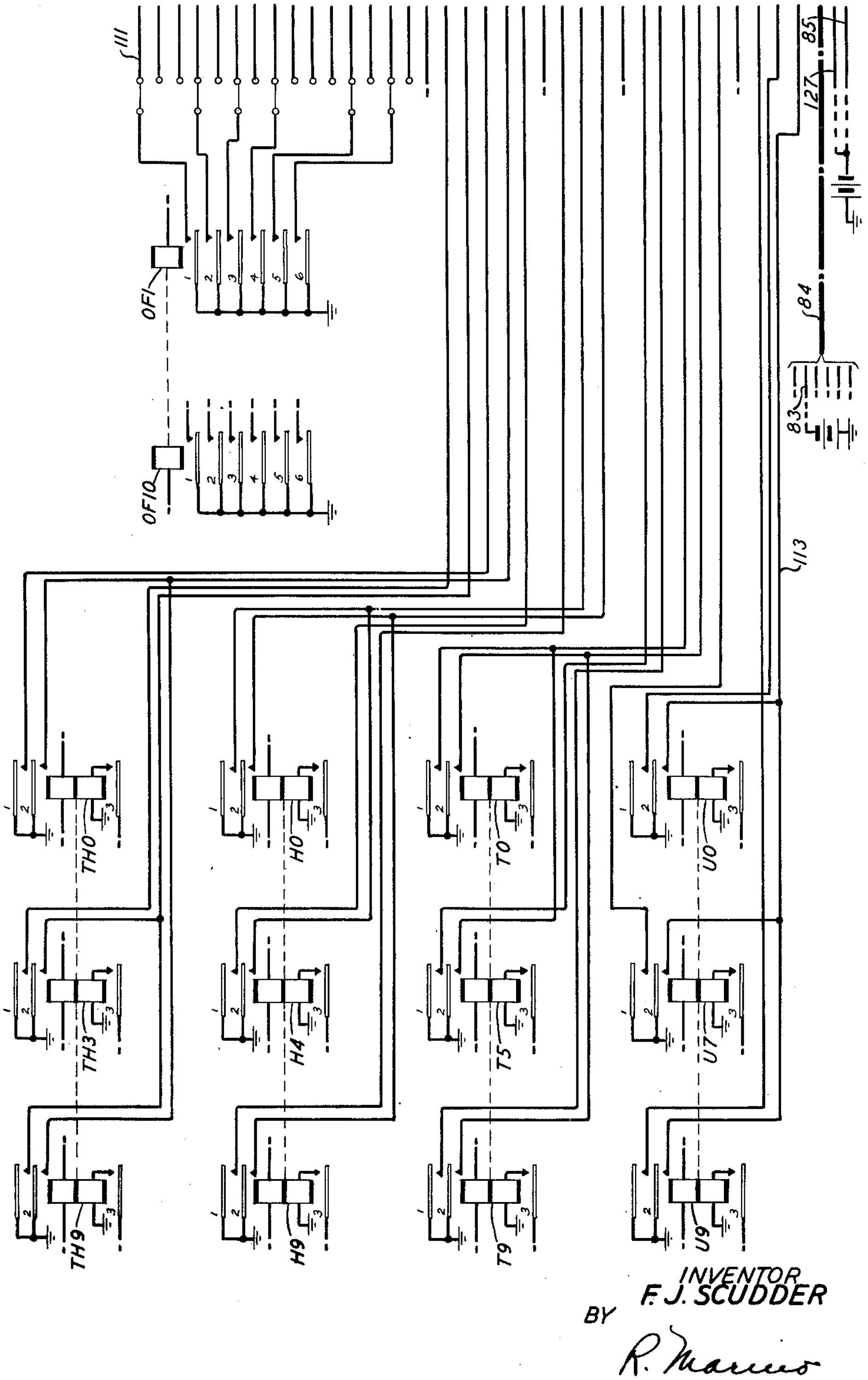
Figure 23:
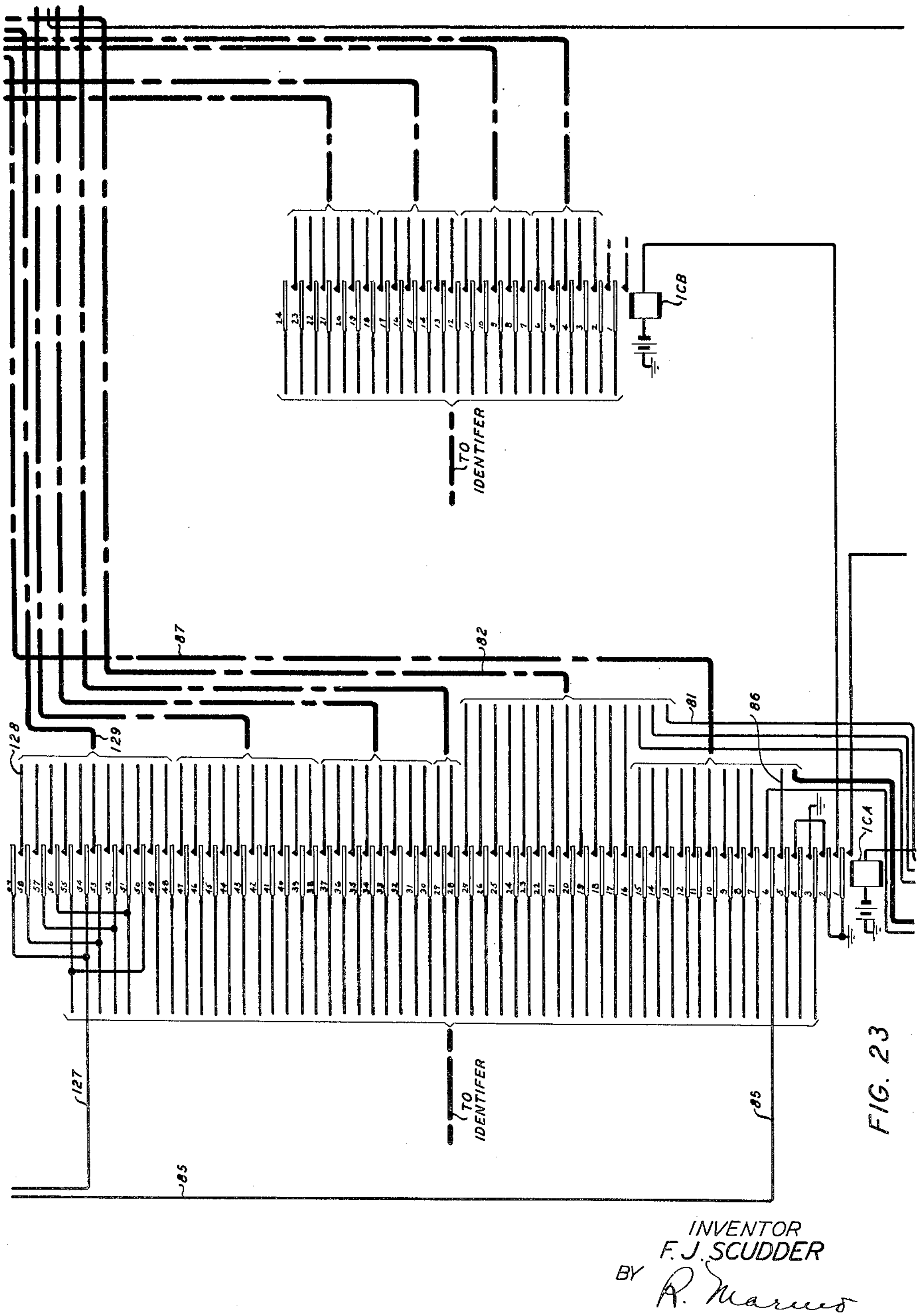
Figure 24:
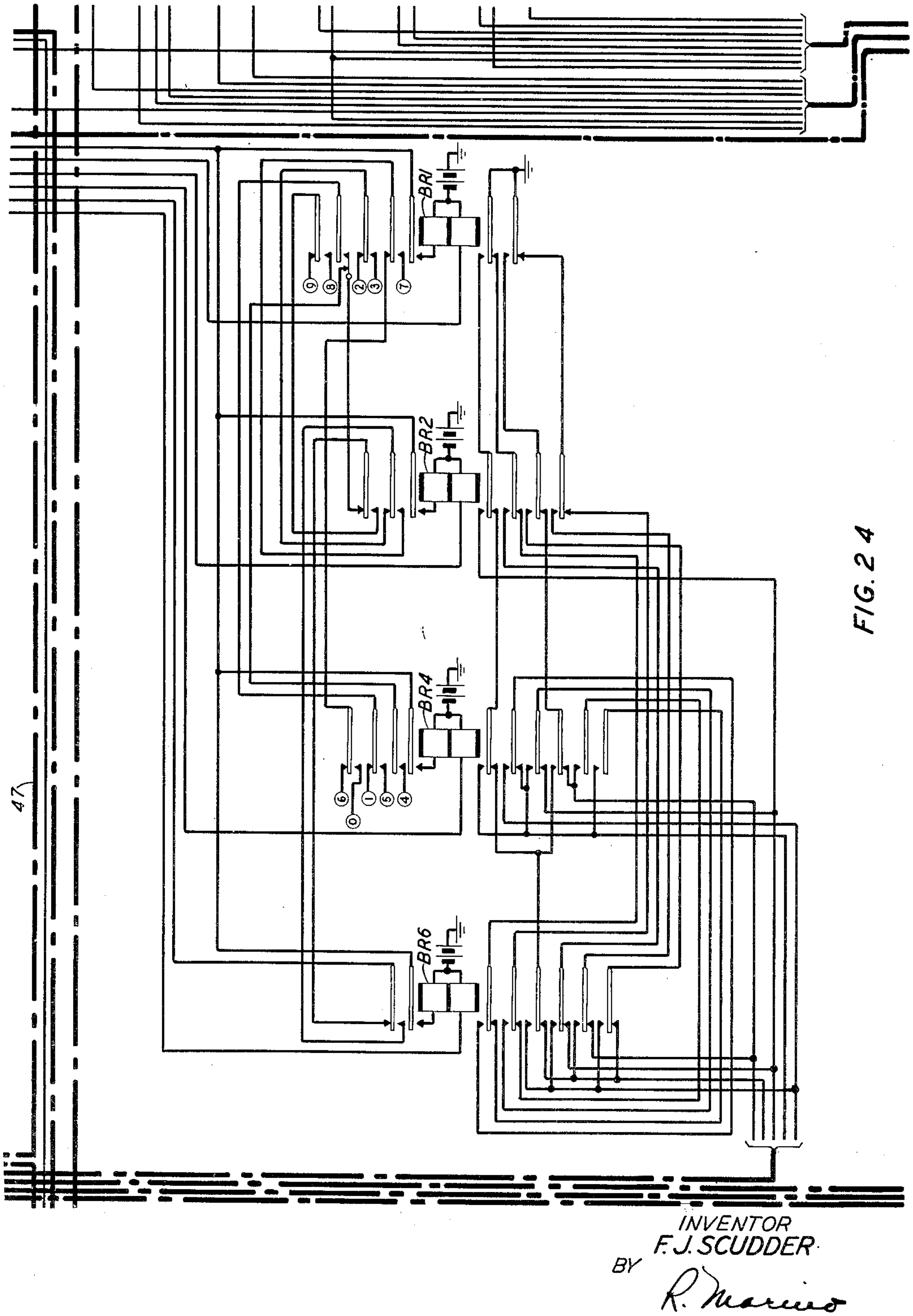
Figure 25:
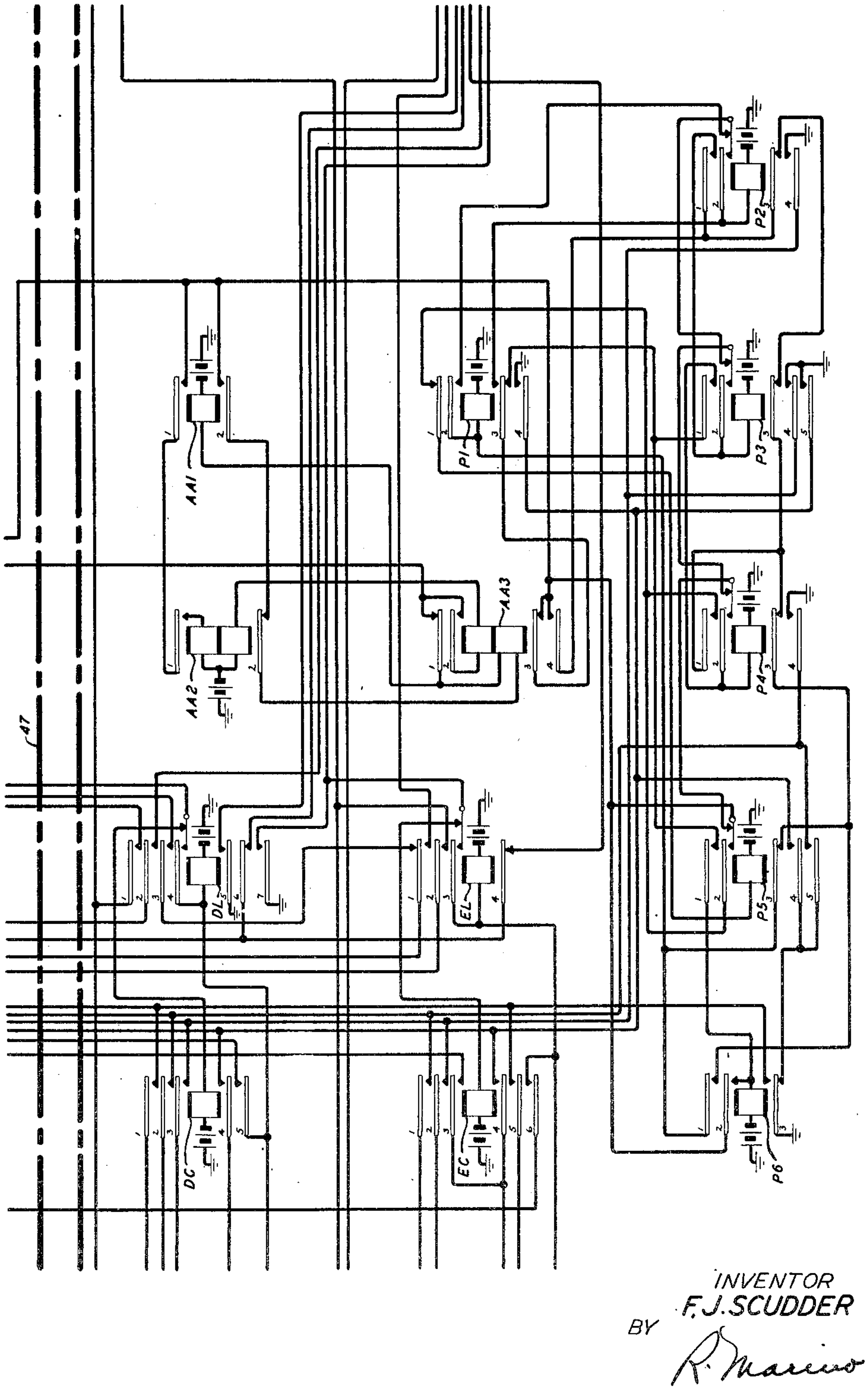
Figure 26:
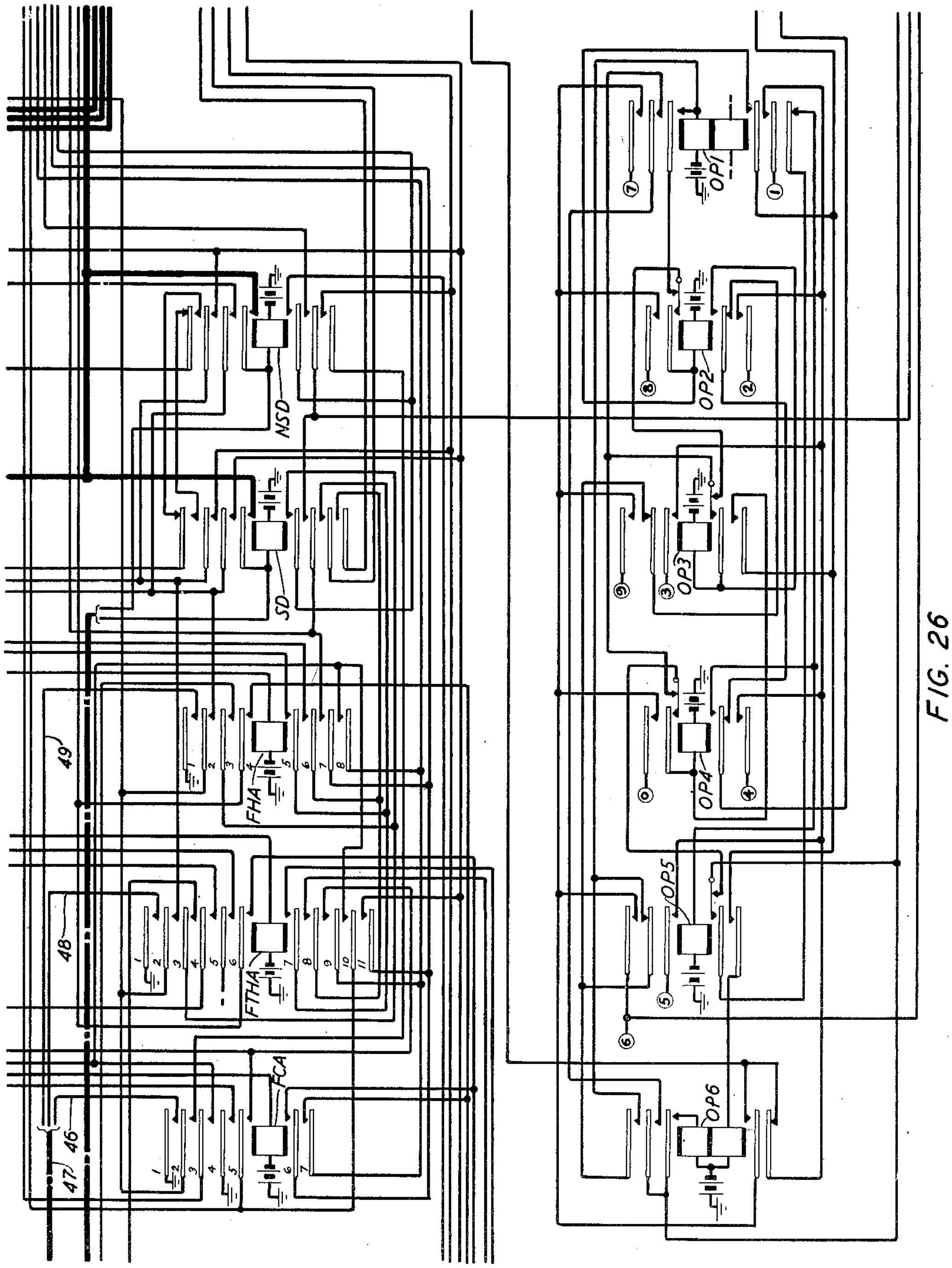
Figure 27:
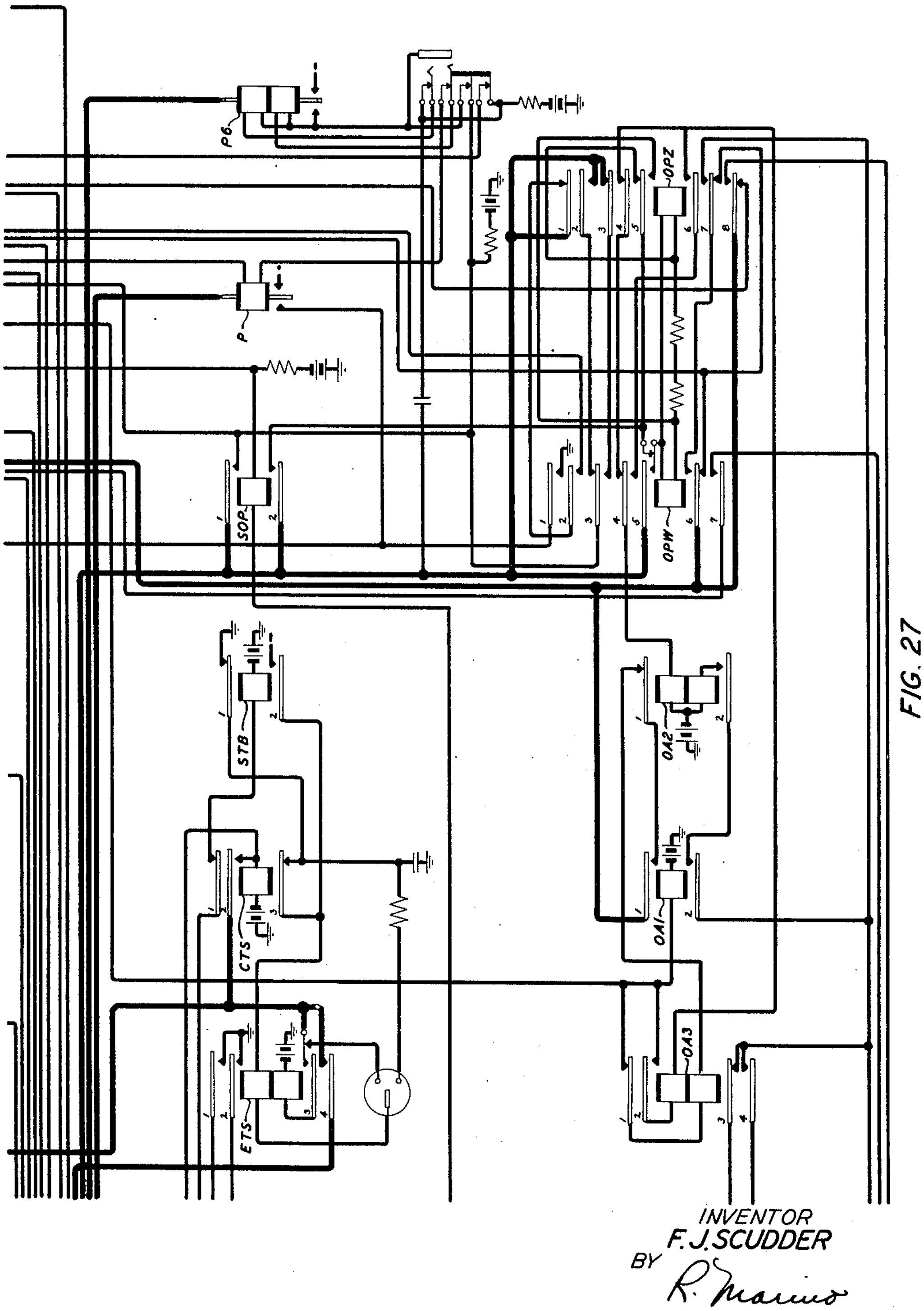
Figure 28:
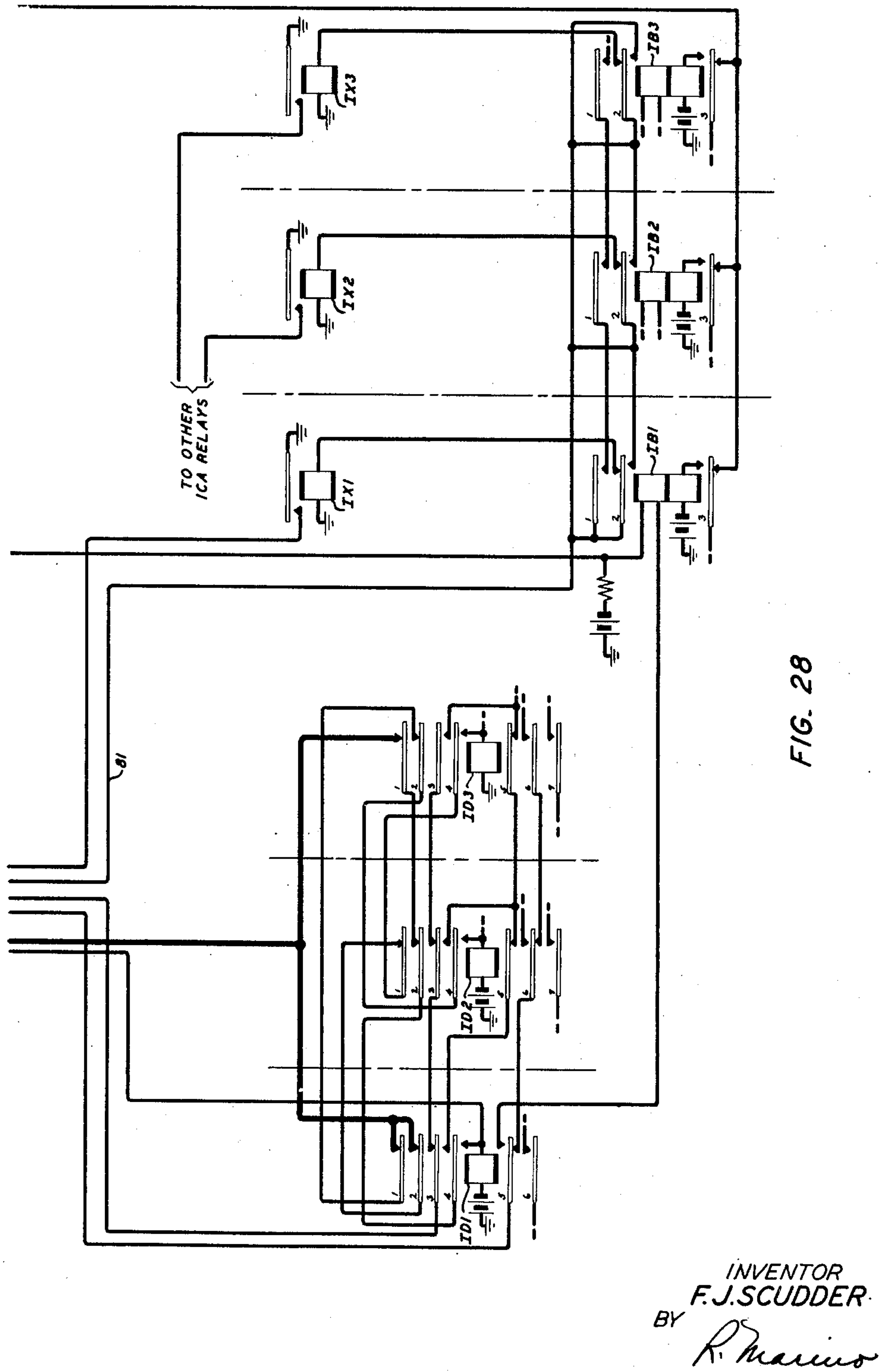
Figure 29:
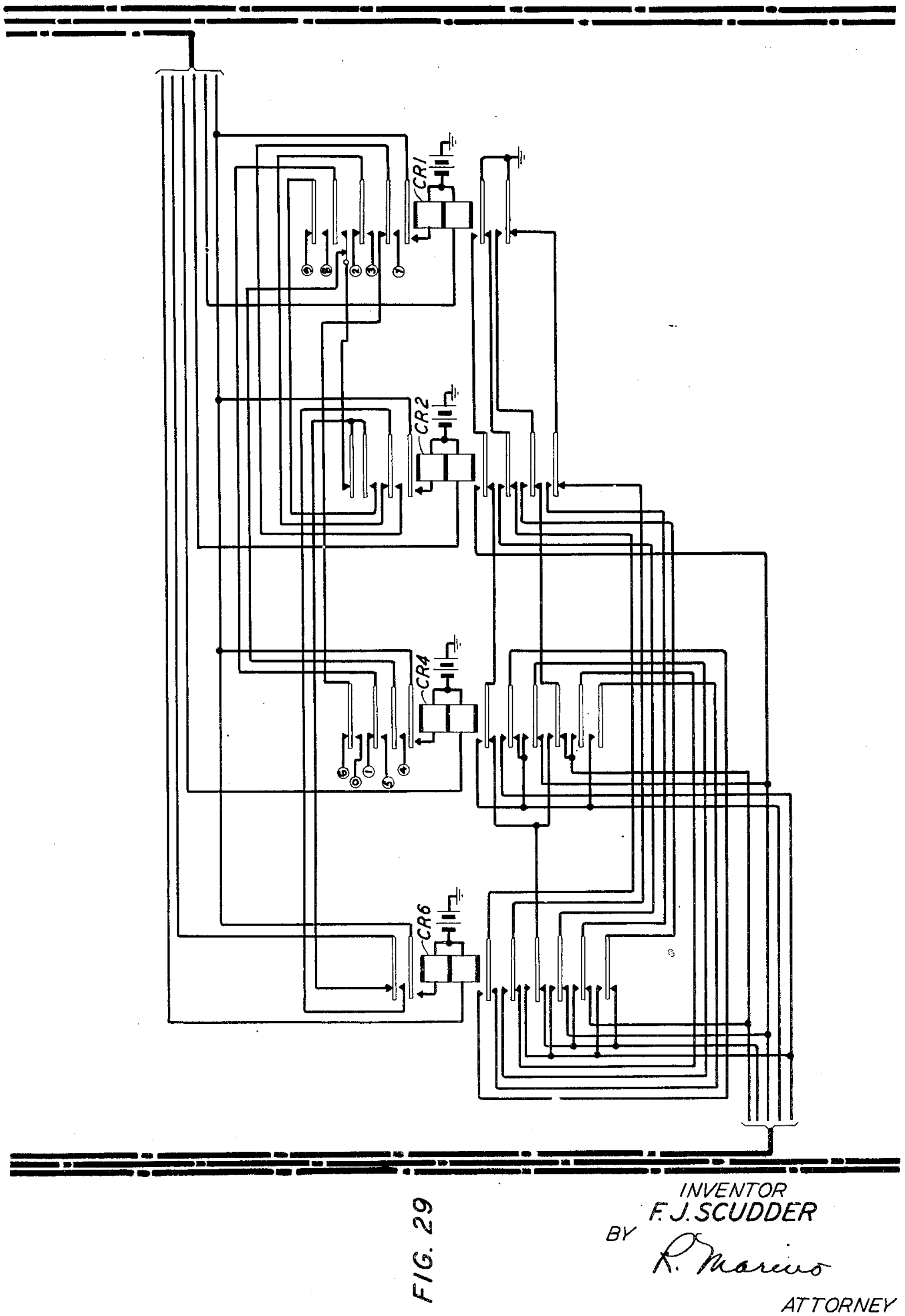
Figure 30:
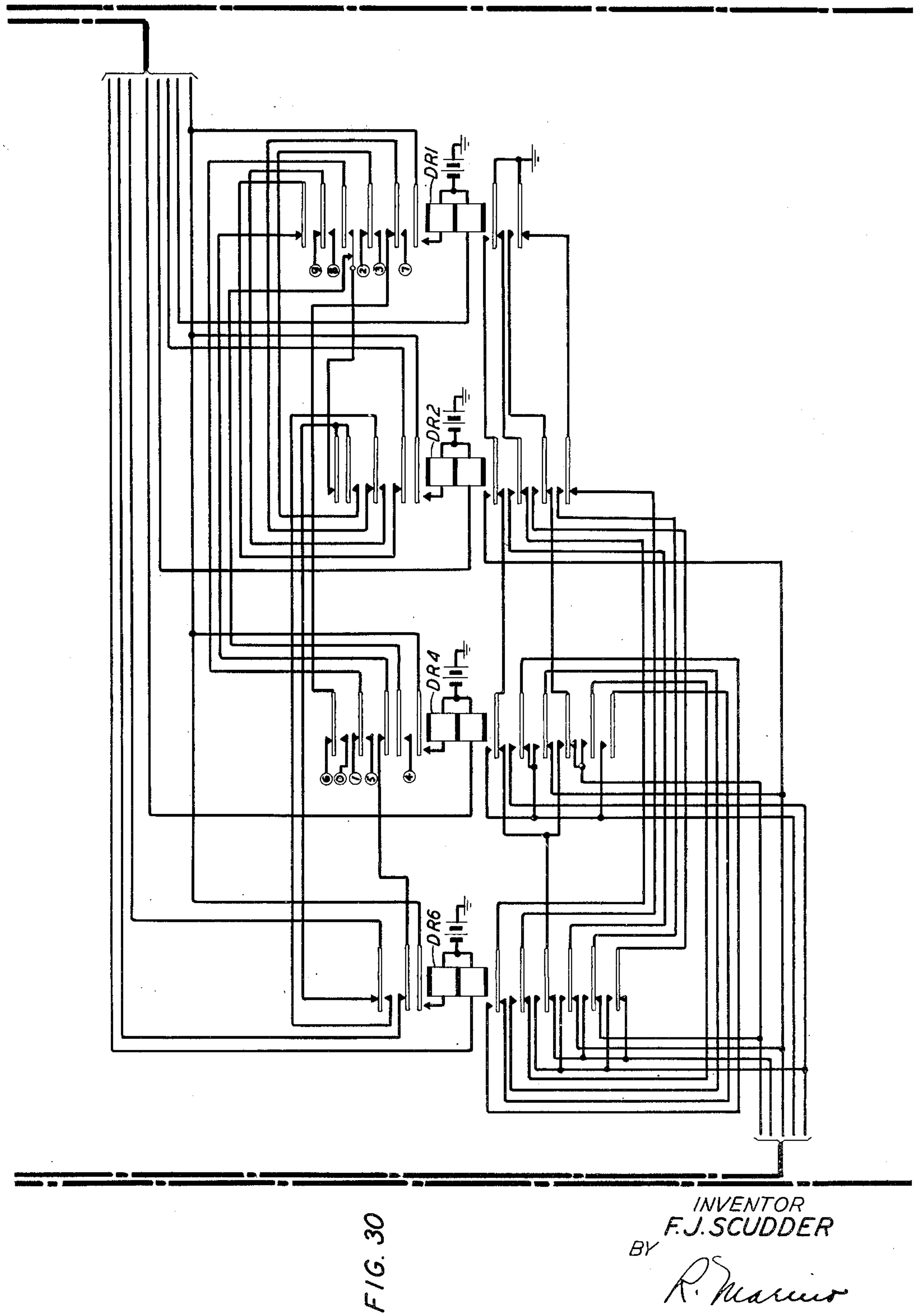
Figure 31:
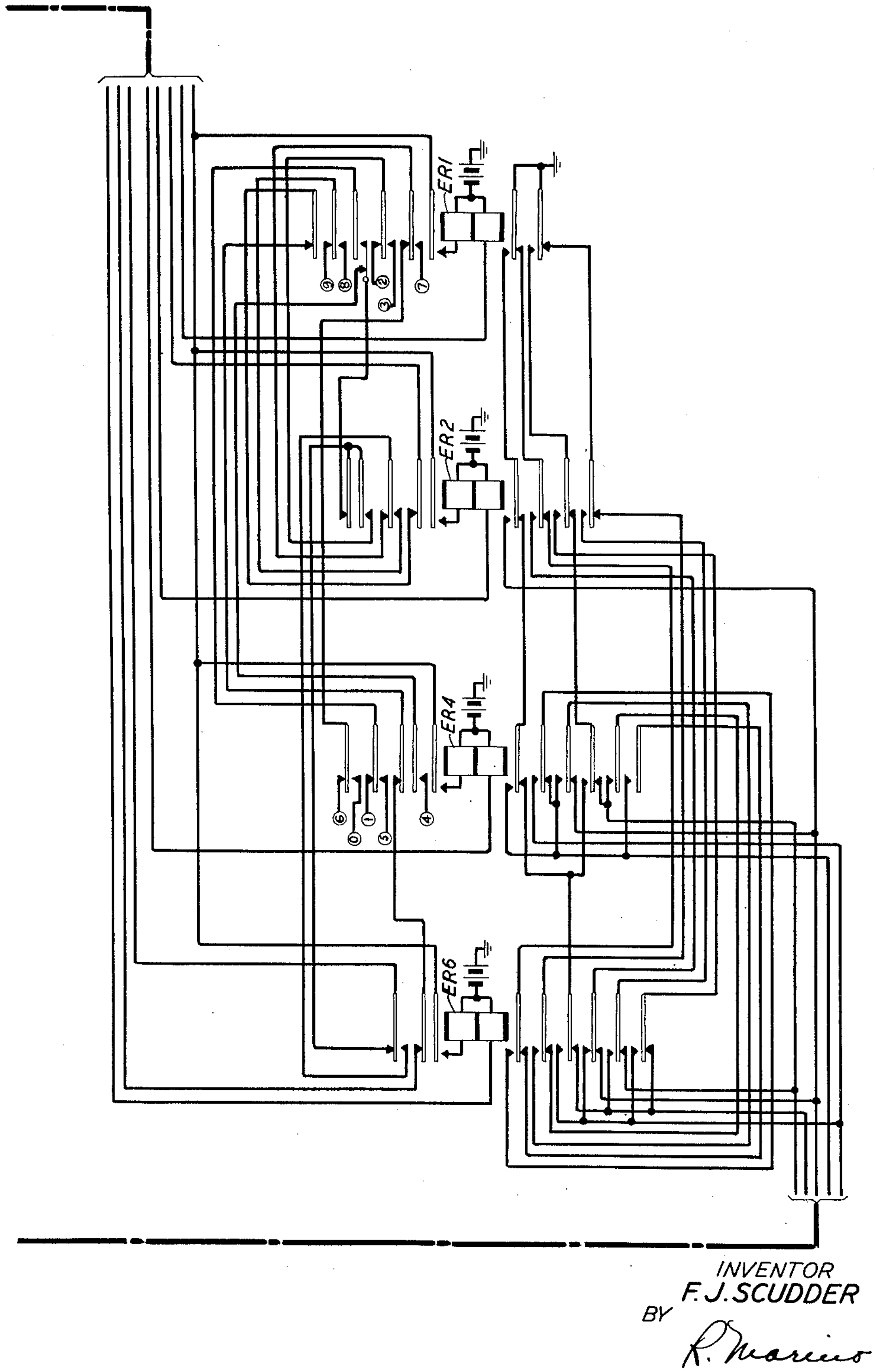
Figure 32:
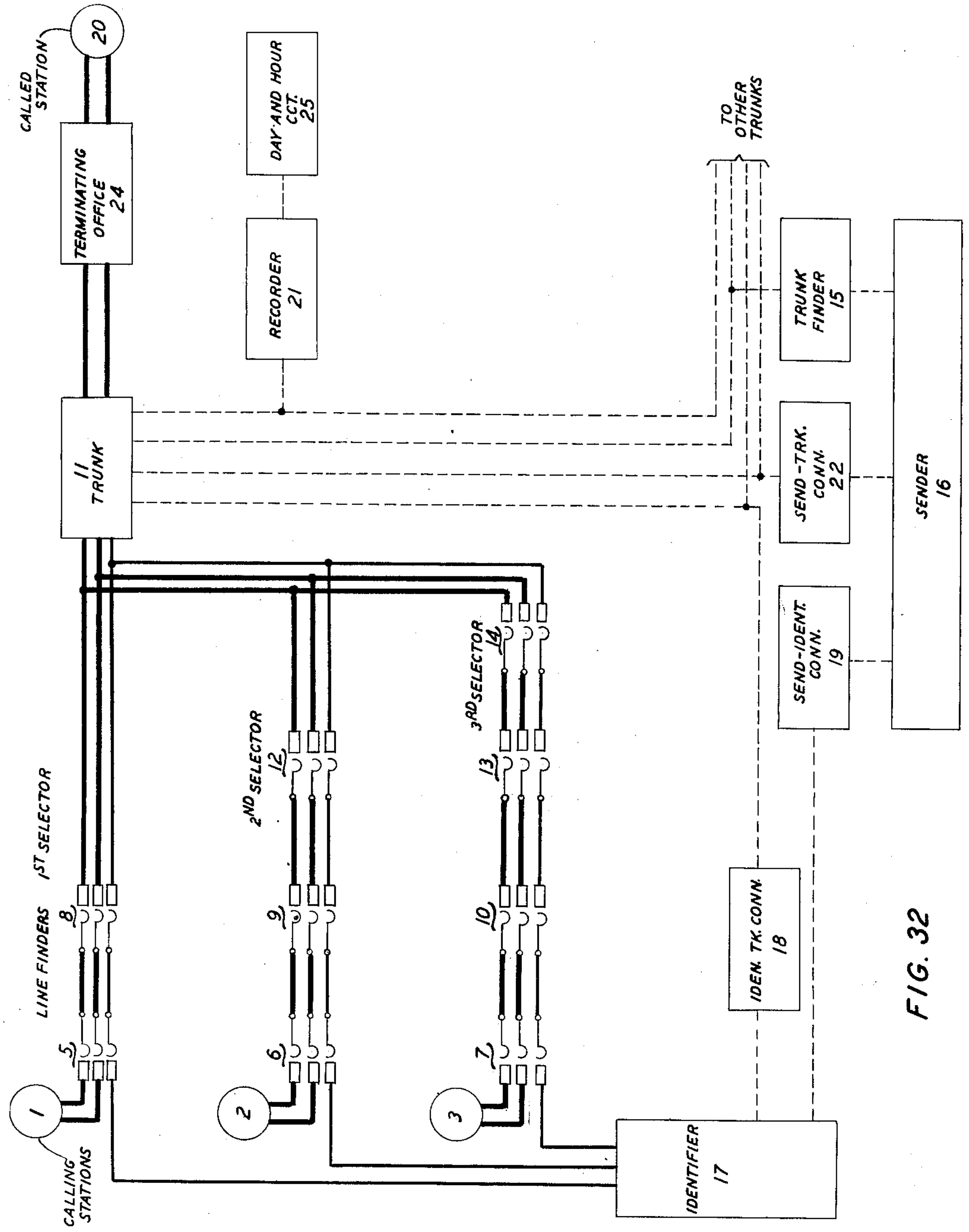

Figs. 8 to 11, 13 to 16, 18 to 21, 24 to 27 and 29 to 31, inclusive, show the circuits of a sender;

Fig. 12 shows the circuits of the sender-trunk connector;

Figs. 17, 23 and 28 show the circuits of the sender-identifier connector;

Fig. 22 shows a part of the circuits of the identifier;

Fig. 32 is a block diagram showing the relations of the various circuits employed in the system, and Fig. 33 shows how all the figures (except Fig. 32) should be arranged with relation to one another to disclose completely the invention.

The invention is illustrated in connection with a system employing equipment of the step-by-step type and having an identifier for identifying calling lines and for reconstructing office codes dialed by calling subscribers. The identifier employed in this illustration is similar to the identifier disclosed in the aforementioned copending Gooderham application with the exception of the additional circuits disclosed in Fig. 22.

Figure 6:
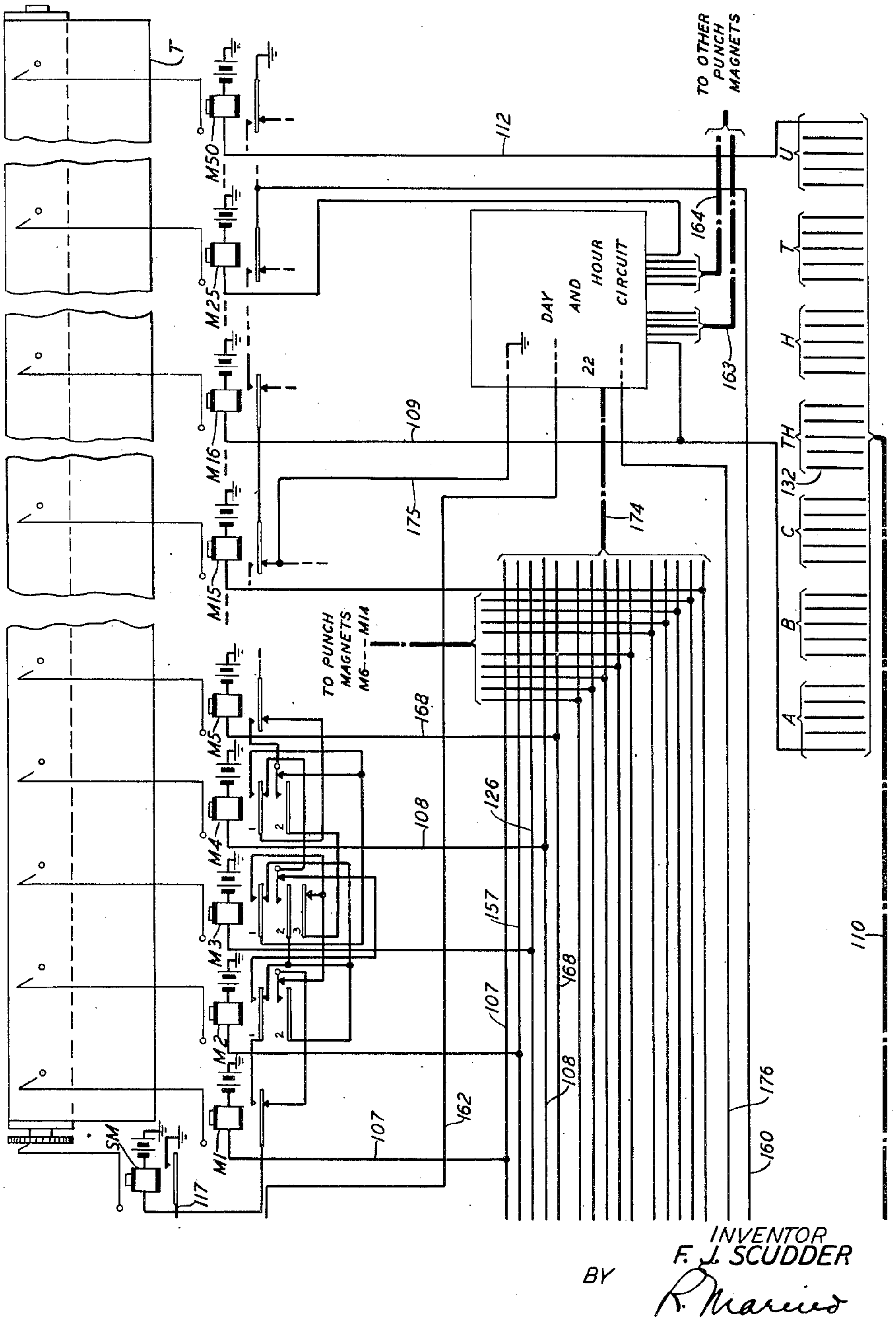
Fig. 6 shows the circuits of the recorder, and also indicates by a block, the day and hour circuit.
Figure 7:
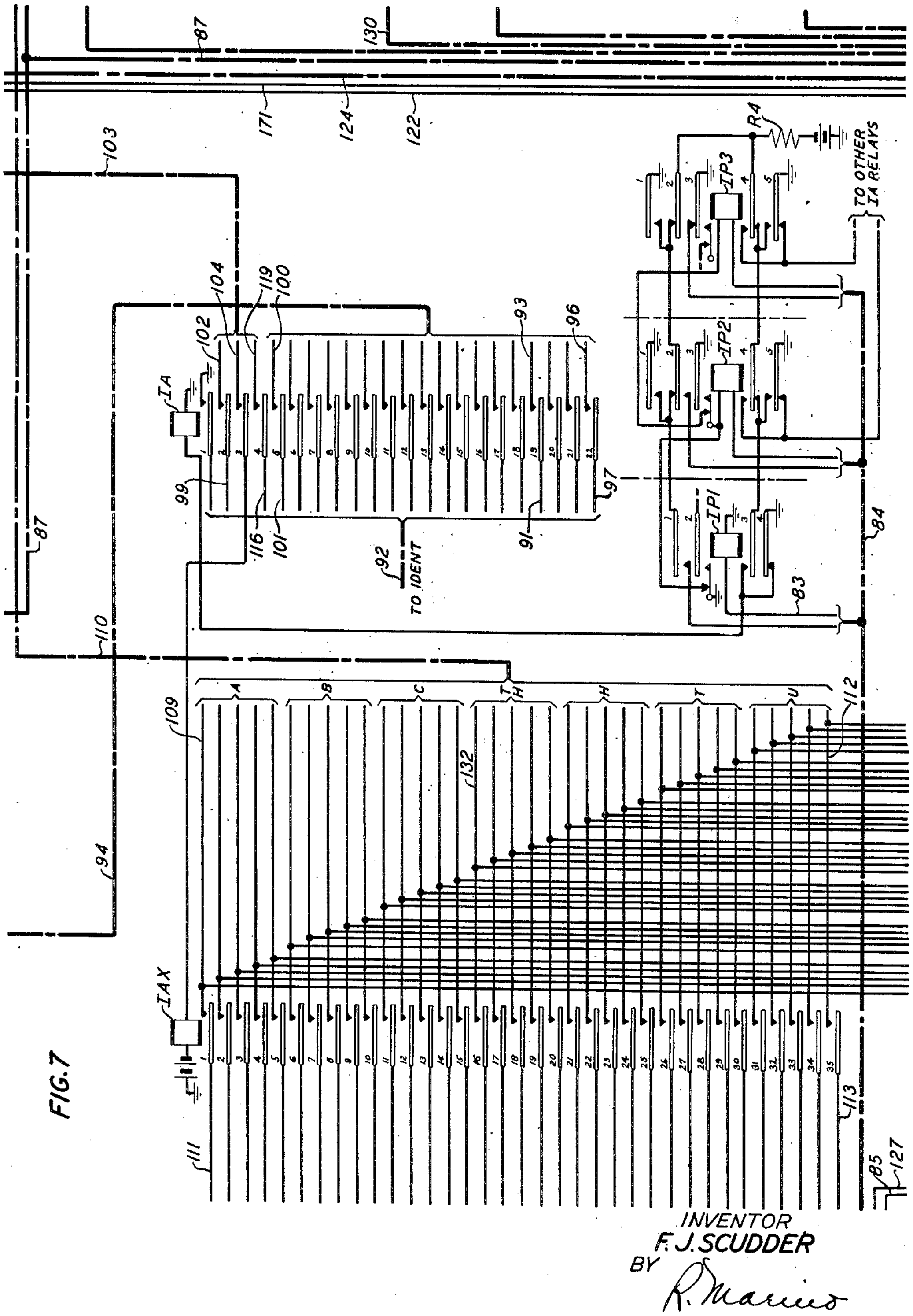
Fig. 7 shows the circuits of the identifier-trunk connector.
Figure 8:
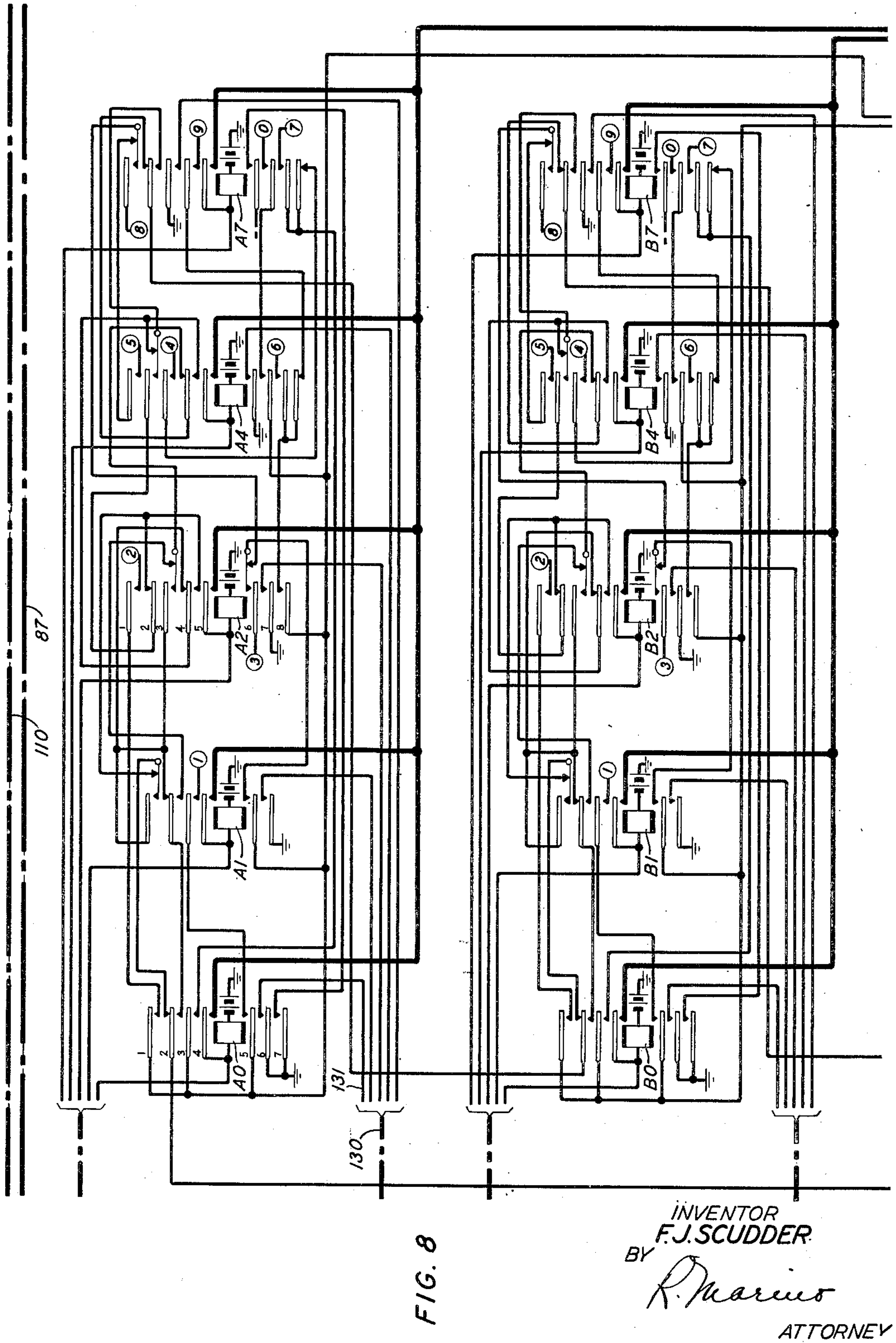
Figure 9:
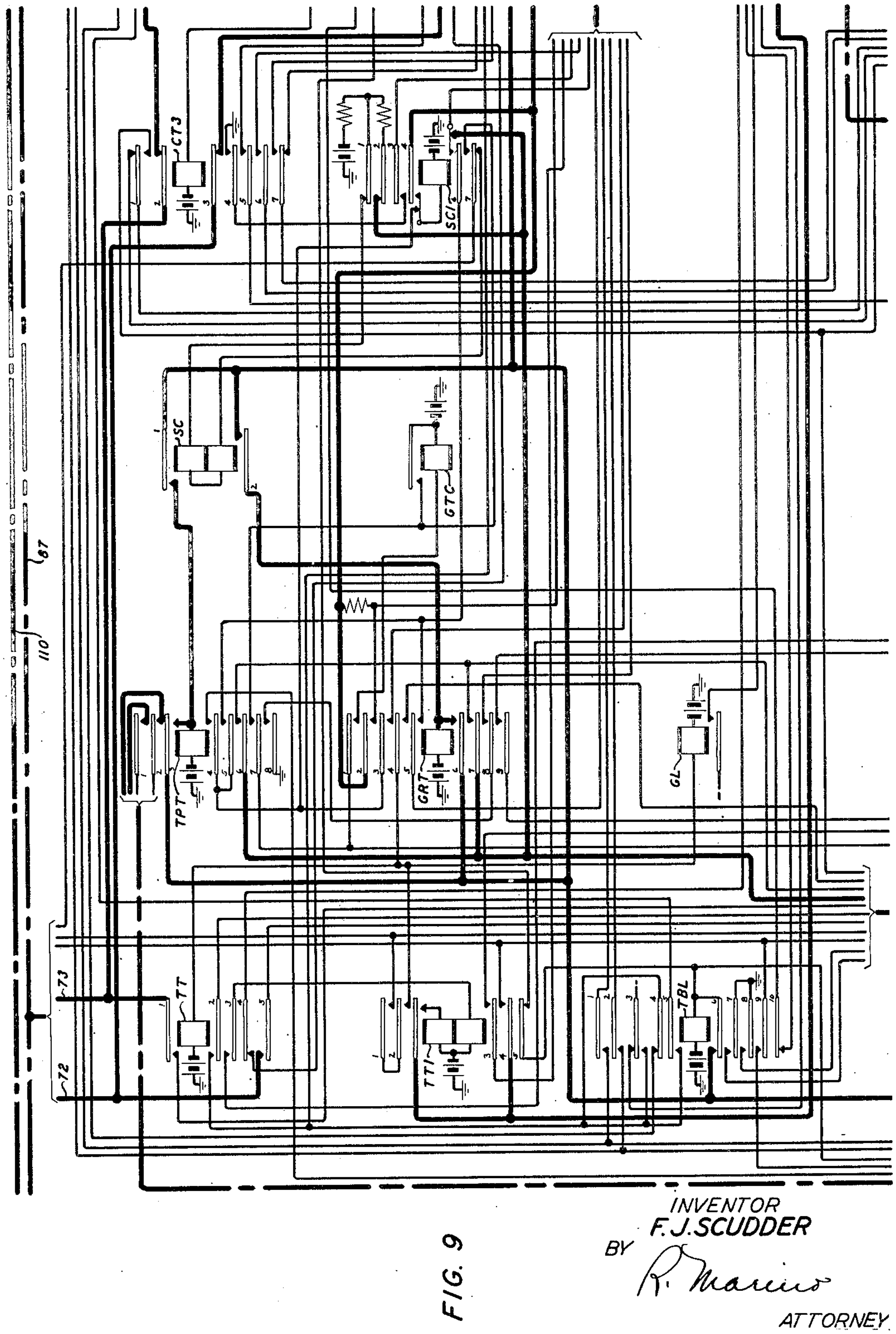
Figure 10:
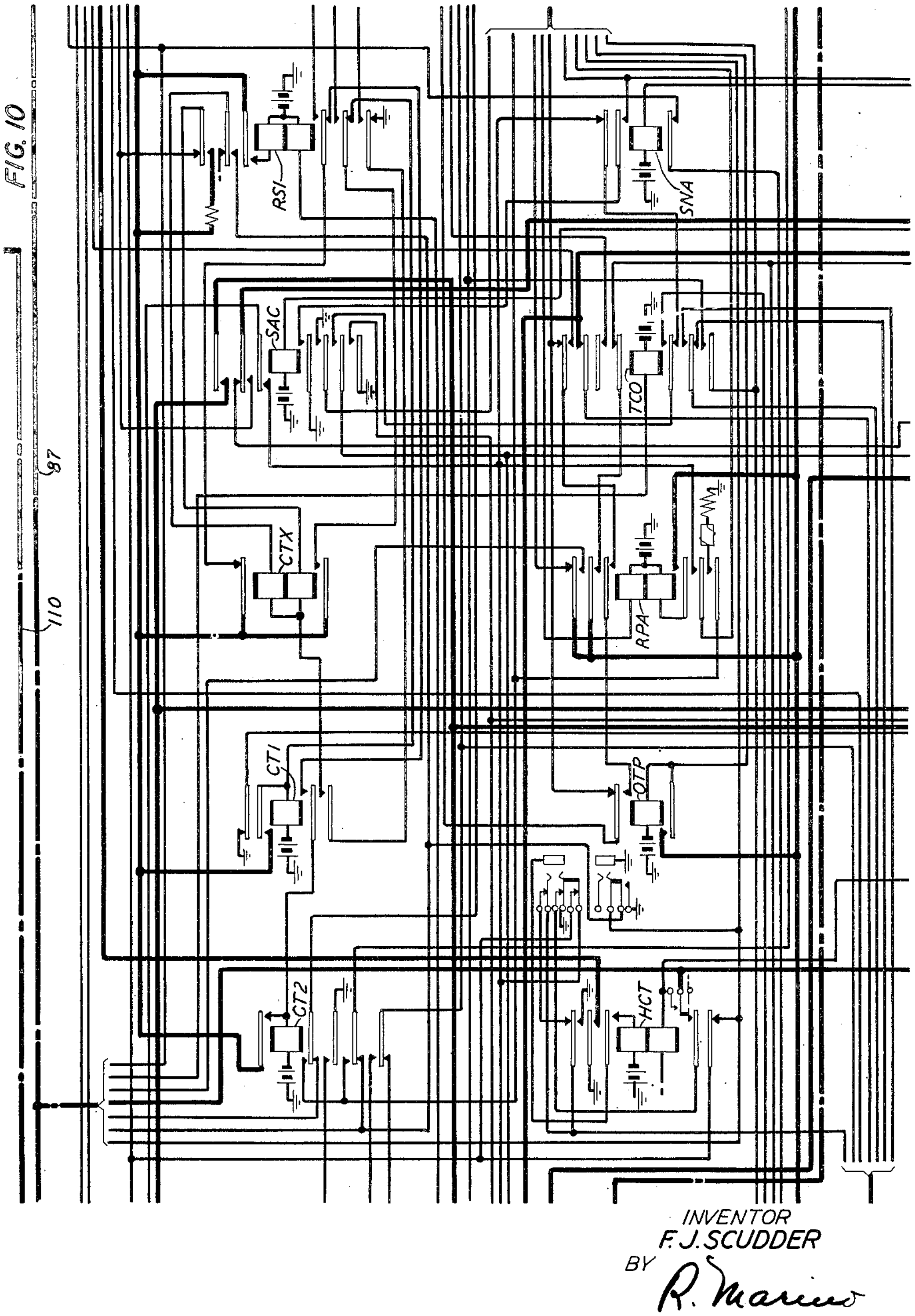
Figure 11:
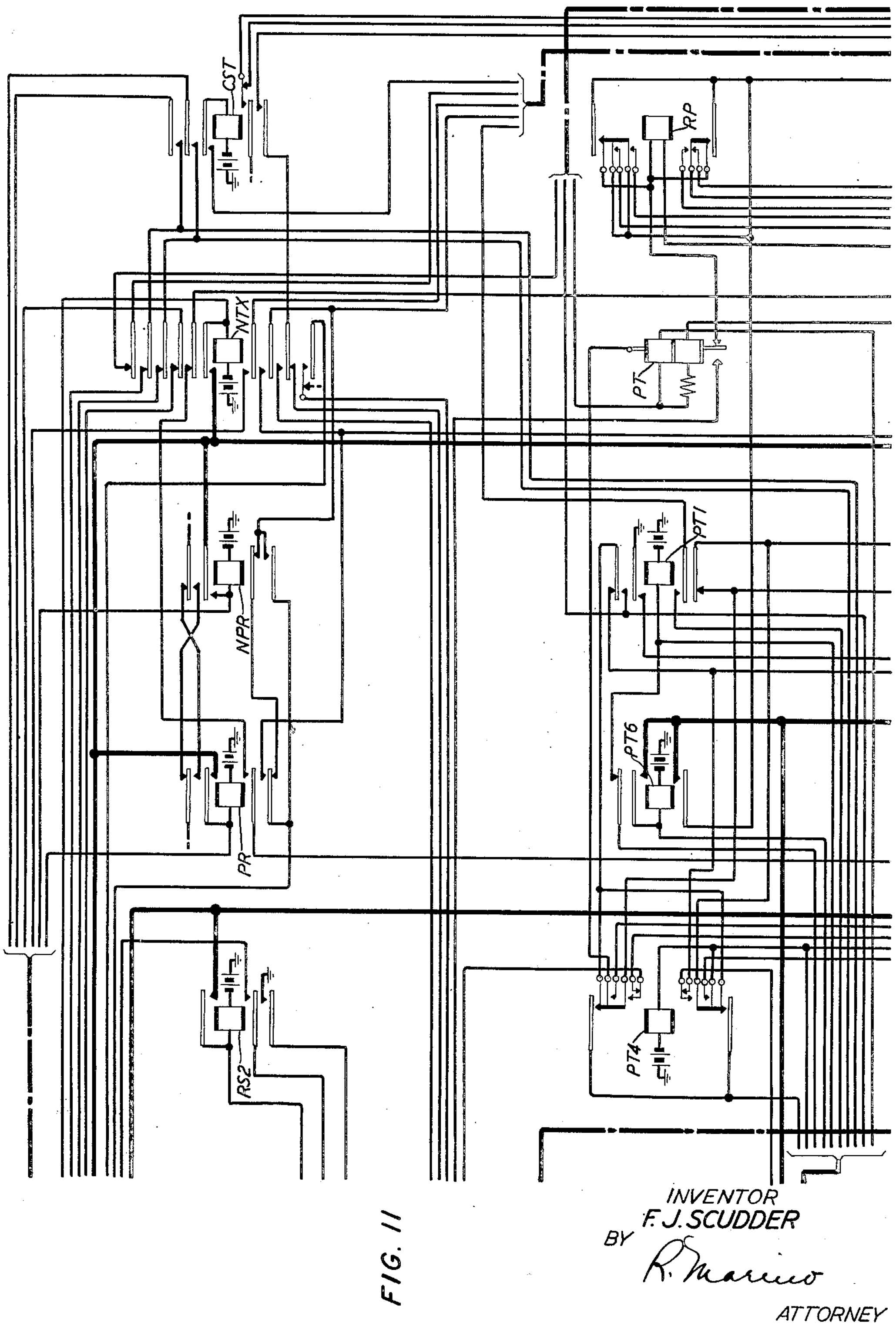

The recorder employed in the present embodiment of the invention and partly disclosed in Fig. 6, is a device of well-known form comprising a plurality of punch magnets M1 . . . M50 each controlling a punch (schematically indicated in Fig. 6). The punch magnets are operated for recording in combinations of two of five adjacent magnets to impress across a paper tape T a series of characters representing digits, in accordance with the following code:

| Digit | Magnets Operated in Group of Five Magnets |
|---|---|
| 1 | 1st and 2nd. |
| 2 | 1st and 3rd. |
| 3 | 2nd and 3rd. |
| 4 | 1st and 4th. |
| 5 | 2nd and 4th. |
| 6 | 3rd and 4th. |
| 7 | 1st and 5th. |
| 8 | 2nd and 5th. |
| 9 | 3rd and 5th. |
| 0 | 4th and 5th. |

A stepping magnet SM, when operated and released, shifts the tape T to a position for punching another line of characters by another operation of said punch magnets. Reference may be had to the copending application of W. W. Carpenter Serial No. 588,401 filed April 14, 1945, now Patent No. 2,583,086, granted January 22, 1952, for a more complete description of the construction and operation of a recording device of this kind.

Before proceeding with a detailed description of the operation of the various circuits employed in the present embodiment of the invention, the general functions of the circuits and equipment will be described in connection with Fig. 32. Referring to this figure, when a call is originated by the removal of the receiver at a subscriber's station, such as one of the stations 1, 2 or 3, a line finder 5, 6 or 7 connects the calling station to a first selector 8, 9 or 10. Upon receiving the usual dial tone, the calling party dials the office code and number of the station to which connection is desired, in the usual manner. In the case of station 1, the first digit dialed actuates the first selector 8 to connect the calling station to a trunk, for example, trunk 11. In the case of station 2, the first digit dialed actuates a first selector 9 and the second digit dialed actuates a second selector 12 to connect said station to trunk 11, while in the case of station 3, three selectors 10, 13 and 14, actuated respectively by the first three digits dialed, are used to extend the connection to trunk 11.

When the calling station has been connected to a trunk, such as trunk 11, by one, two or three selectors as described above, the next digit dialed at the calling station, which is the second digit in the case of station 1, the third digit in the case of station 2 and the fourth digit in the case of station 3, is registered in the trunk. A trunk finder 15 connects a sender 16 to the trunk 11 and the remaining digits dialed at the calling station are registered in said sender.

An identifier 17 is also connected to the trunk 11 by an identifier-trunk connector 18 and to the sender 16 by an identifier-sender connector 19. The identifier 17, by recovering from the trunk 11 the digit registered therein and from the line finder switches the digits expended in extending the line to trunk 11, and from the sender the digit or digits, if any, of the office code dialed therein, reconstructs said office code and causes the registration of the digits of said code in the sender 16, which is thereby enabled to complete the connection of the calling station through the terminating office 24 to the called station 20.

The identifier 17 also determines the office in which the calling line is located and the number of said line. The trunk 11 then connects itself to a recorder 21 common to a plurality of trunks and actuates said recorder to record characters representing the number of said trunk and a "type of entry" digit which indicates that the particular entry concerns the calling-line information. At the same time, the identifier 17 actuates the recorder 21 to perforate the tape with characters representing the office code and number of the calling station. The recorder tape is then moved to a new position for recording another entry and the identifier 17 is disconnected from the trunk and from the sender, the recorder being now free for use by other trunks.

Upon the completion of the registration of the called-line information in the sender 16, the sender is connected to the recorder by the sender-trunk connector 22. The trunk 11 again connects itself to the recorder 21 and causes the perforation of the tape with characters representing the number of the trunk and a "type of entry" digit which indicates that the particular entry pertains to the called-line information. At the same time, the sender 16 controls the recorder 21 to perforate the tape with characters representing the office code and number of the called station. The recorder tape is then moved to a new position for recording the next entry, and the sender, when it has completed its functions, is disconnected from the trunk. The recorder is again free to be used by other trunks for entries relating to other calls.

When the call is answered by the removal of the receiver at the called station 20, the trunk 11 again connects to the recorder 21 and causes perforation of characters representing the number of said trunk and a "type of entry" digit which indicates that the particular entry pertains to the beginning of conversation time. A day and hour circuit 25 also controls the recorder 21 to perforate the tape with characters representing the interval of time in which the answer occurs. The tape is then moved to a new position for recording the next entry and the recorder is again free for use in other trunks.

When either the called party or the calling party restores his receiver, the trunk 11 again connects itself to the recorder 21 and causes perforation of the tape with characters representing the number of said trunk and a "type of entry" digit which indicates that the particular entry pertains to the end of conversation time. The day and hour circuit 25 again causes perforation of characters representing the interval of time in which the call terminates. The tape is then moved to a new position for recording the next entry and the recorder is again free.

While the foregoing description has been confined to the functions of the circuits in recording information relating to one call completed over trunk 11, it will be understood that the circuits function in the same manner in recording on recorder 21 similar information relating to other calls completed over other trunks not shown.

For each completed call for which the calling subscriber is to be charged, four entries are thus made on the tape of the recorder. The first two entries are made at the time the call is initiated. Some time elapses, however, between the recording of the second and third entries and between the recording of the third and fourth entries. Since the recorder is, during these intervals, available to other trunks, the entries pertaining to any one call will be found interspersed on the recorder tape among entries pertaining to other calls. However, it will be observed that each entry contains the number of the trunk over which the subscriber's connection is established. The four entries of a call, although not adjacent, can, therefore, be identified as the four successive entries containing the same trunk number, since, during the time of the connection, the particular trunk could not have been used for another call and its number, therefore, does not appear in any of the intervening entries. The character of the information recorded in each entry is indicated by the "type of entry" digit contained in the entry. Periodically, the day and hour circuit 25 causes the recorder 21 to perforate the tape with characters representing current time, these entries serving to indicate the time-period within which each subscriber's call entry is made.

Thus, there may be obtained, from the four entries of each completed call, all the information required to compute the charges to be made for the call. Initial entries are made for uncompleted calls but such calls, for which no charges should be made, are plainly indicated by the absence of associated answer and disconnect entries following the initial entries. The perforated paper tape on which the call-record information is recorded is adapted for use with automatic billing machines by which the subscriber's bills may be produced.

For a clear understanding of the invention and the mode of its operation, the establishment and recording of a call from calling station 2 to called station 20 will now be described with reference to Figs. 1 to 31.

Figure 2:
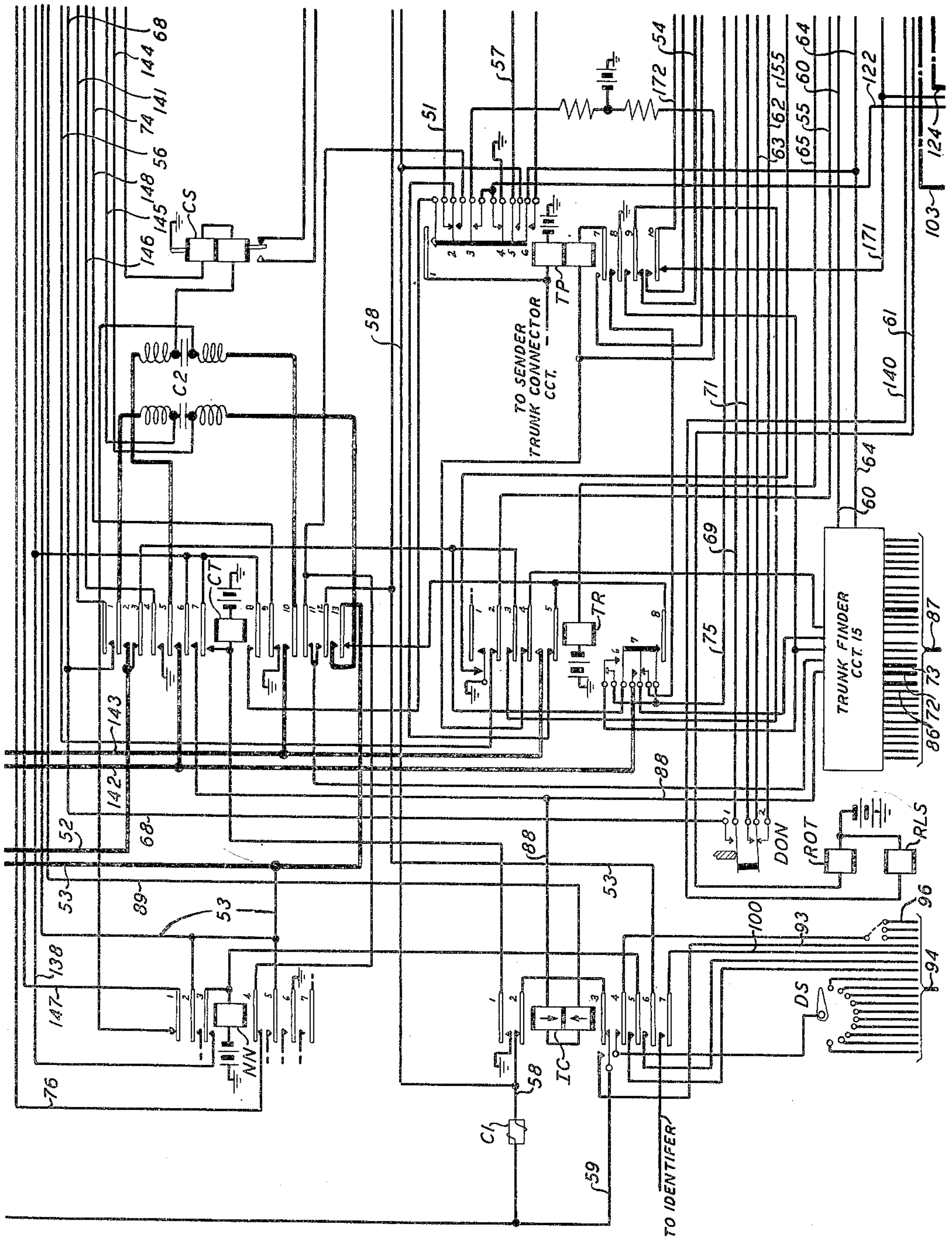
Figs. 2, 3, 4 and 5 show the circuits of a trunk.
Figure 3:
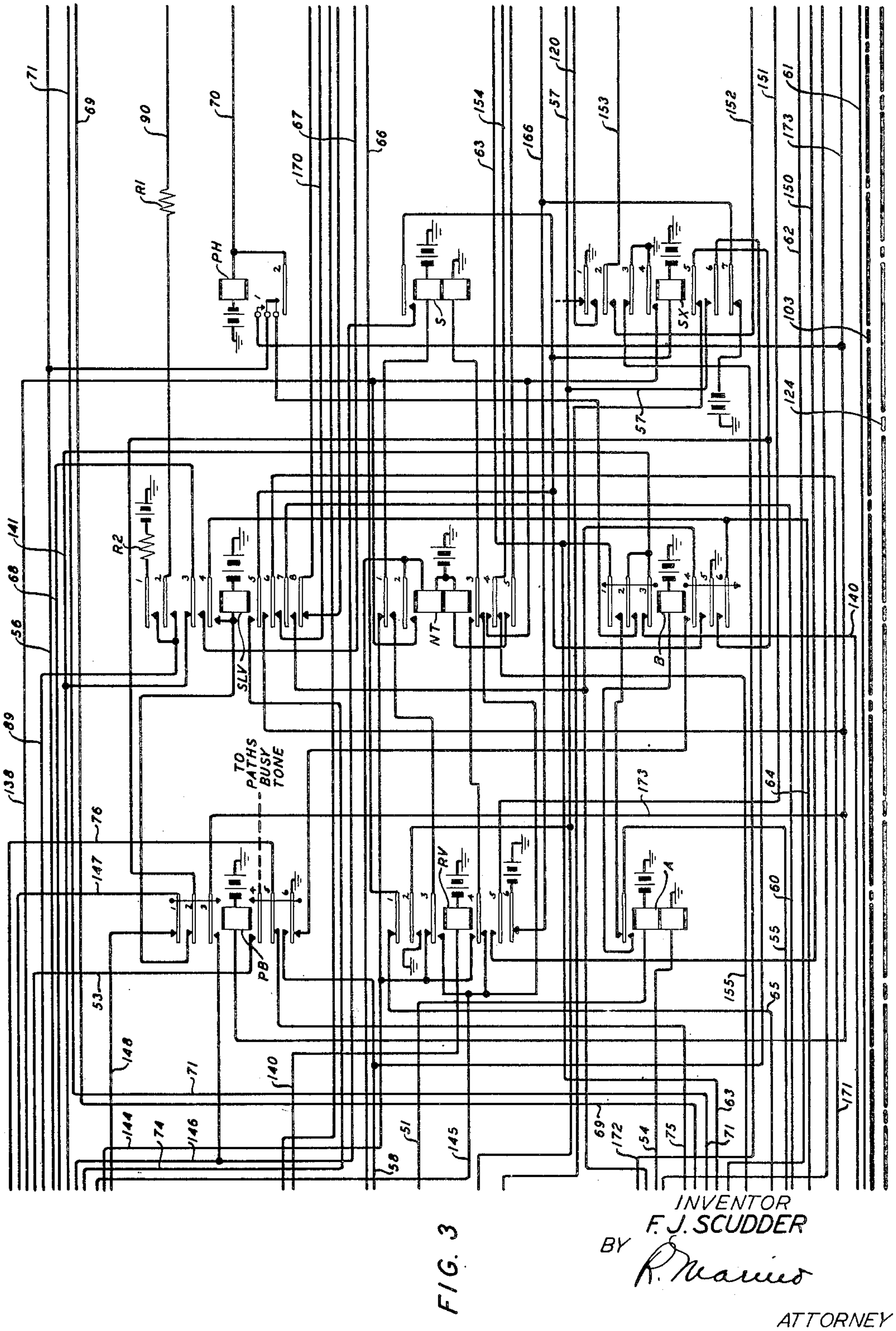
Figure 4:
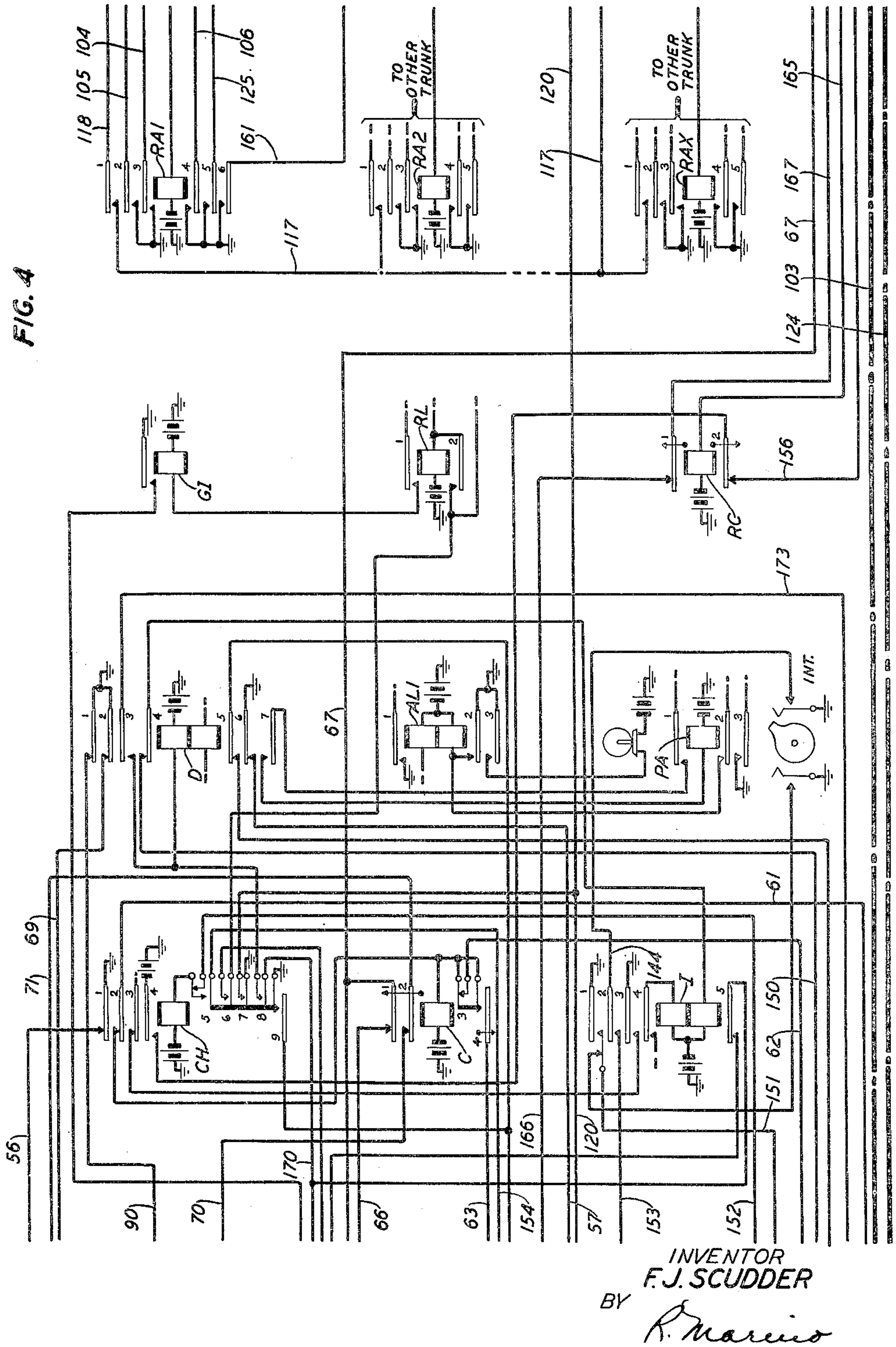
Figure 5:
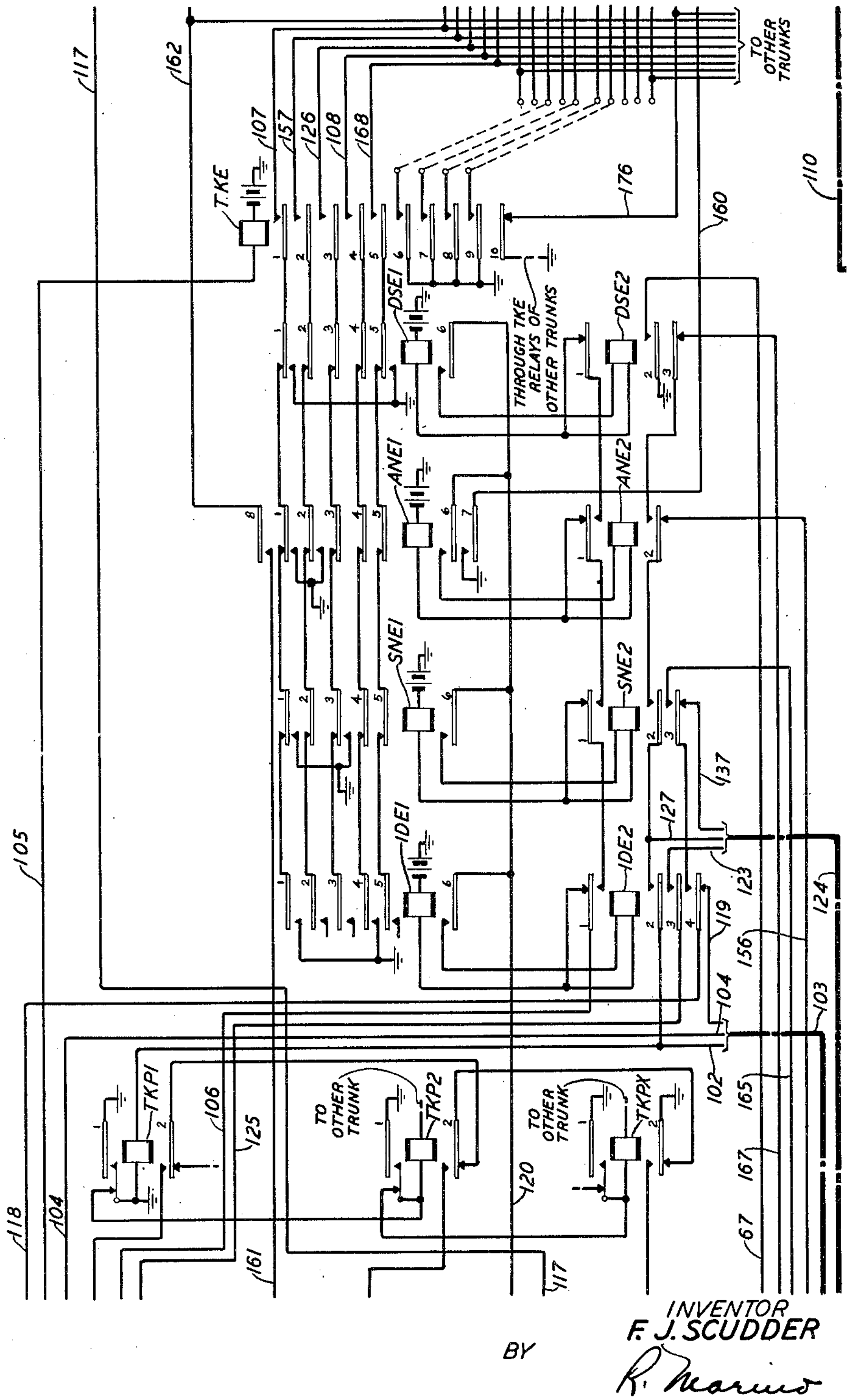

When a call is originated by the removal of the receiver at station 2, connection is established between said station and first selector 9 by the operation of line finder 6 in the well-known manner. The subscriber at station 2 receives the usual dial tone indicating that he may dial and dials the directory number of the desired station. The dialing of the first digit operates the first selector 9 and the dialing of the second digit operates the second selector 12 in the well-known manner to extend the connection to a trunk, the circuit of which is shown in Figs. 2, 3 and 4.

Relay A then operates over a circuit extending from battery through the upper winding of said relay, conductor 51, No. 2 back contact of relay TP, No. 5 contacts of relay TR, No. 13 back contact of relay CT, ring conductor 53 of the trunk extended through selectors 12 and 9, line finder 6, and switchhook contacts of station 2, to tip conductor 52 of the trunk, No. 3 contacts of relay CT, No. 3 contacts of relay TR, No. 9 back contacts of relay TP, conductor 54, and lower winding of relay A to ground, completing a circuit for relay B extending from battery through the winding of said relay, front contacts of relay A, conductor 55, No. 2 contacts of relay TR, conductor 56, and No. 1 contacts of relay CH to ground. Relay B operates over said circuit and its No. 5 contacts complete an obvious circuit for relay SX, operating the latter relay. Ground at No. 6 contacts of relay D is now connected over conductor 57, No. 6 contacts of relay SX, conductor 58, and No. 2 contacts and No. 3 back contacts of relay IC, and sleeve conductor 59 to selectors 9 and 12 preventing release of said selectors. Ground at No. 6 contacts of relay PB is also connected through No. 4 contacts of relay B and No. 7 contacts of relay SLV to conductor 60 to the trunk finder 15, of well-known type, causing said trunk finder to connect the sender to the trunk.

The calling party at station 2 continues to dial the remaining digits of the called-line number. When the previously-traced circuit over which relay A operated is opened by the first pulse of the dial at station 2, relay A releases for the duration of the pulse, but relay B is a slow-release relay and does not release. The rotary magnet ROT of switch DS and relay C then operate in parallel over a circuit extending from battery through the winding of rotary magnet ROT, conductor 61, and No. 2 contacts of relay CH, and from battery through the winding and No. 3 contacts of relay C, conductor 62, No. 2 normal contacts of off-normal contacts DON of switch DS, conductor 63, No. 1, contacts of relay B, back contacts of relay A, conductor 55, No. 2 contacts of relay TR, conductor 56, and No. 1 contact of relay CH to ground. When relay A then operates again, the circuit of rotary magnet ROT is opened and said magnet releases, moving the brush of switch DS one terminal, and when relay A is again released by a pulse of the dial at station 2, rotary magnet ROT again operates over a circuit extending from battery through the winding of said rotary magnet, conductor 61, No. 2 contacts of relay CH, No. 4 contacts of relay C, conductor 63, No. 1 contacts of relay B, back contact of relay A, conductor 55, No. 2 contacts of relay TR, conductor 56, and No. 1 contacts of relay CH to ground. Each operation and release of rotary magnet ROT at each pulse of the dial at station 2, moves the arm of switch DS one terminal, thus registering on switch DS the digit dialed by the subscriber. Relay C is a slow-release relay and having once operated on the first release of relay A, does not release during the rapid pulses of the dial.

When the train of pulses from the dial ceases, however, the period before the next train of pulses is commenced is sufficient to allow the release of relay C. If at this time, a sender has been connected to the trunk by trunk finder 15, relay SLV will be operated by battery through its winding, No. 2 contacts of relay PB, and No. 6 contacts of relay B to ground in the trunk finder on conductor 64. Relay TR then operates over a circuit extending from battery through the winding of said relay, conductor 65, No. 1 contacts of relay RV, conductor 66, No. 1 contacts of relay C, conductor 67, No. 3 front contact of relay SLV, conductor 68, No. 1 contacts of off-normal contacts DON, conductor 69, and No. 2 contacts of relay D to ground.

Should a sender not be connected to the trunk when relay C releases as described above, relay SLV will not be operated as there will be no ground in trunk finder 15 on conductor 64. When relay A is then released by the first dial pulse of the next train of pulses, relay PH operates over a circuit extending from battery through the winding of said relay, conductor 70, No. 2 contacts of relay C, conductor 71, No. 2 front contact of off-normal contacts DON, conductor 63, No. 1 contacts of relay B, back contacts of relay A, conductor 55, No. 2 contacts of relay TR, conductor 56, and No. 1 contacts of relay CH to ground. Relay PB then operates over a circuit extending from battery through the winding of said relay, No. 1 contacts of relay PH, conductor 56, and No. 1 contacts of relay CH to ground. The No. 4 contacts of relay PB connect a paths-busy tone to ring conductor 53, which is extended through selectors 12 and 9 and line finder 6 to station 2. The No. 6 contacts of relay PB also disconnect the ground, previously traced, on conductor 60 to the trunk finder 15, causing said trunk finder to disconnect the sender from the trunk if one shall have been connected in the meanwhile.

If the sender is connected in time for relay TR to operate as described above, the No. 3 and No. 5 contacts of said relay open the circuit of relay A, releasing said relay and, in turn, relay B. Relay SX is held operated over a circuit extending from battery through the winding of said relay, No. 5 contacts of relay SLV, conductor 74, and No. 9 contacts of relay CT to ground. By the operation of relay TR, the line of station 2, extended through line finder 6 and selectors 9 and 12, is connected over tip conductor 52 of the trunk, No. 3 contacts of relay CT, No. 6 front contacts of relay TR through the trunk finder 15 to conductor 72 within bracket 87 to the sender and over ring conductor 53 of the trunk, No. 13 back contacts of relay CT, No. 8 contacts of relay TR, conductor 75, No. 5 contacts of relay PB, conductor 76, No. 4 contacts of relay NN, and No. 11 contacts of relay CT through the trunk finder 15 to conductor 73 within bracket 87 to the sender for registering in said sender the remainder of the digits dialed. The number of pulses in each train dialed thereafter at station 2 are counted by the operation of relays P1 . . . P6 and registered by the operation of register relays in combination, in the conventional manner.

The first digit registered in the sender (in the present example, the fourth digit dialed at station 2) is registered by relays AR1, AR2, AR4 and AR6, the second digit by relays BR1, BR2, BR4 and BR6, the third digit by relays CR1, CR2, CR4 and CR6 and the fourth digit by relays DR1, DR2, DR4 and DR6. In the case of a station, such as station 1, where one digit is utilized to establish connection to the trunk and one digit is registered in the trunk, as previously described, the last digit dialed is registered on relays ER1, ER2, ER4 and ER6. In the case of a station, such as station 3, where three digits are utilized to establish connection to the trunk and one digit is registered in the trunk, the last digit dialed is registered by relays CR1, CR2, CR4 and CR6. Relays DR1, DR2, DR4 and DR6 and ER1, ER2, ER4 and ER6 are not then operated. The register relays are operated to register the several digits in accordance with the following code:

| Digit | Suffixes of Designations of Register Relays Operated |
|---|---|
| 1 | 1 |
| 2 | 2 |
| 3 | 1 and 2 |
| 4 | 4 |
| 5 | 1 and 4 |
| 6 | 6 |
| 7 | 1 and 6 |
| 8 | 2 and 6 |
| 9 | 1, 2 and 6 |
| 0 | 4 and 6 |

As a result of these operations, relay AL is also operated and the operated register relays are locked up through their upper windings and their own contacts.

When the first digit has been registered in the sender, (in this case, the fourth digit dialed) a circuit is completed from battery through resistance TRR, No. 4 contacts of relay TRX, conductor 77, No. 3 contacts of relay AL, conductor 78, No. 3 contacts of relay IRL, conductor 79, No. 1 contacts of relay SMX, conductor 80, No. 2 contacts of relay TR2, conductor 81 within bracket 82, No. 2 back contacts of relay IB1, and the winding of the preference relay IX1, associated with an idle identifier, to ground, over which relay IX1 operates, completing an obvious circuit for relay ICA which, in turn, operates relay ICB. The two latter relays connect the identifier to the sender. Battery in the identifier over conductor 83 within bracket 84 and through the winding of the preference relay IP1, associated with the trunk, to ground, operates said preference relay which completes a circuit from battery through resistance R4, No. 4 back contacts of relays IP3 and IP2, in series, No. 3 front contacts of relay IP1, and winding of relay IA to ground over which relay IA operates, connecting the identifier to the trunk.

A circuit is thereby completed from battery in the identifier over conductor 85, No. 6 contacts of relay ICA, conductor 86 within bracket 87, through trunk finder 15, conductor 88, the two windings of relay IC in series, conductor 89, No. 2 contacts of relay SLV, resistance R1, conductor 90, and No. 1 contacts of relay D to ground. Relay IC is a polarized relay with differential windings. The current through said windings in the above circuit in parallel with resistance R2, which is connected to the circuit by No. 1 contacts of relay SLV, causes relay IC to actuate its lower set of contacts but not its upper set. The No. 3 normal contacts of relay IC open the shunt around coil C1 and the No. 3 front contacts of said relay complete a circuit from the identifier over conductor 91 within bracket 92, No. 19 contacts of relay IA, conductor 93 within bracket 94 to sleeve conductor 59 of the trunk, which is extended through selectors 12 and 9 and linefinder 6, and the sleeve conductor 95 of the line of station 2, back to the identifier. The No. 4 contacts of relay IC connect conductor 97 within bracket 92 from the identifier through No. 22 contacts of relay IA and conductor 96 within bracket 94 to the brush of switch DS, the terminals of which are connected by conductors within bracket 94 through No. 6 . . . No. 15 contacts of relay IA and conductors within bracket 92 to the identifier. The No. 7 contacts of relay IC connect conductor 101 within bracket 92 from the identifier through No. 5 contacts of relay IA, and conductor 100 within bracket 94 to the identifier.

By means of the circuits traced above, the identifier, in the manner fully described in the aforesaid Gooderham application, operates to reconstruct the office code dialed at station 2, to register said office code by the operation of combinations of register relays A0 . . . A7, B0 . . . B7, and C0 . . . C7 of the sender, and to register by the operation of a combination of register relays TK0 . . . TK7 of the sender, the digit which was registered by switch DS of the trunk, as previously described. In registering the digits of the office code and the digit registered in the trunk, the aforesaid relays are operated in combinations in accordance with the following code:

| Digit | Suffixes of Designations of Register Relays Operated |
|---|---|
| 1 | 0 and 1 |
| 2 | 0 and 2 |
| 3 | 1 and 2 |
| 4 | 0 and 4 |
| 5 | 1 and 4 |
| 6 | 2 and 4 |
| 7 | 0 and 7 |
| 8 | 1 and 7 |
| 9 | 2 and 7 |
| 0 | 4 and 7 |

If the digit registered in the trunk is the second digit dialed, the identifier also operates relay FC, thereby operating relay FCA over an obvious circuit. Relay FCB then operates over a circuit extending from battery through the winding of said relay, conductor 46 within bracket 47, and No. 1 contacts of relay FCA to ground. If the digit registered in the trunk is the third digit dialed, the identifier operates relay FTH, thereby operating relay FTHA over an obvious circuit. Relay FTHB then operates over a circuit extending from battery through the winding of said relay, conductor 48 within bracket 47, and No. 1 contacts of relay FTHA to ground. If the digit registered in the trunk is the fourth digit dialed, the identifier operates relay FH, thereby operating relay FHA over an obvious circuit. Relay FHB then operates over a circuit extending from battery through the winding of said relay, conductor 49 within bracket 47, and No. 1 contacts of relay FHA to ground.

It will be observed that the number of the called line, which is composed of the fourth, fifth, sixth, and seventh digits dialed, will be registered by relays BR1 . . . BR6, CR1 . . . CR6, DR1 . . . DR6, and ER1 . . . ER6 in the case of a call from station 1, by relays AR1 . . . AR6, BR1 . . . BR6, CR1 . . . CR6, and DR1 . . . DR6 in the case of a call from station 2, and by relays TK1 . . . TK7, AR1 . . . AR6, BR1 . . . BR6, and CR1 . . . CR6 in the case of a call from station 3. It is the function of relays FC, FCA, FTH, FTHA, FH, and FHA to make connections within the sender in accordance with the registration of the called line number and it is the function of relays FCB, FTHB, and FHB to make similar connections with respect to the recorder. In the present example of a call made from station 2, the number of the called line is registered by relays AR1 . . . AR6, BR1 . . . BR6, CR1 . . . CR6, and DR1 . . . DR6 and relays FTH, FTHA, and FTHB are operated, as described above.

The identifier also, in the manner set forth in the aforesaid Gooderham application, identifies the office in which the line of the calling station is located and the number of said line, registering said office by the operation of one of the relay OF1 . . . OF10 in the identifier, each of which may represent an office, and registering the number of the calling line by operating one relay of each group of the register relays TH0 . . . TH9, H0 . . . H9, T0 . . . T9, and U0 . . . U9 in accordance with the respective digits of the calling line number.

Reference may be had to the above-mentioned Gooderham application for a more complete description of the operations of the identifier and the associated operations of the sender.

When the identification of the calling line is completed, battery in the identifier over conductor 99 within bracket 92, No. 2 contacts of relay IA, conductor 102 within bracket 103, and the winding of the preference relay TKP1, as associated with the trunk, to ground, operates said relay, which completes an obvious circuit over which relay RA1 operates. A circuit is thereby completed from battery through the winding of relay IAX, No. 3 contacts of relay IA, conductor 104 within bracket 103, and the No. 3 contacts of relay RA1 to ground, operating relay IAX which connects the identifier to the recorder.

Relay RA1, in operating as described above, completes, at its No. 2 contacts, an obvious circuit for relay TKE. Relay IDE1 also operates over a circuit extending from battery through its winding, No. 1 contacts of relay IDE2, conductor 106, and No. 4 contacts of relay RA1 to ground. The circuit of magnet M1 is thereby completed from battery through the winding of said magnet, conductor 107, and No. 1 contacts of relays TKE, DSE1, ANE1, SNE1, and IDE1 in series to ground. The circuit of magnet M4 is also completed from battery through the winding of said magnet, conductor 108, and No. 4 contacts of relays TKE, DSE1, ANE1, SNE1, and IDE1 in series to ground. Magnets M1 and M4 therefore operate, punching in the tape a character corresponding to the digit "4", in accordance with the code previously given. This is a "type of entry" digit indicating that the line of the record in which it appears contains calling-line information.

The No. 6 and No. 7 contacts of relay TKE are cross-connected to the winding of two of the magnets M6 . . . M10 and the No. 8 and No. 9 contacts of said relay are cross-connected to the windings of two of the magnets M11 . . . M15 in accordance with the number of the trunk with which said relay is associated. For example, if the number of the trunk is "80", the No. 6 contacts of relay TKE are cross-connected to the winding of magnet M6, the No. 7 contacts are cross-connected to the winding of magnet M9, the No. 8 contacts are cross-connected to the winding of magnet M13, and the No. 9 contacts are cross-connected to the winding of magnet M14. Upon the operation of relay TKE, magnets M6, M9, M13, and M14 (not shown) operate over obvious circuits, punching in the tape T characters representing the digits "80," constituting the number of the trunk, which is thereby identified.

Contacts of the register relays OF1 . . . OF10 of the identifier are connected to contacts of relay IAX in accordance with the office codes of the respective offices represented by said register relays. When relay IAX operates, one of the relays OF1 . . . OF10 being operated to register the office of the calling line, punch magnets are thereby operated which record on tape T the office code of said office. For example, assume that station 2 is in office No. 1 and that the code of said office is represented by the digits "425." Relay OF1 is then operated and punch magnet M16 operates over a circuit extending from battery through the winding of said magnet, conductor 109 within bracket 110, No. 1 contacts of relay IAX, conductor 111, and No. 1 contacts of relay OF1 to ground. Punch magnets M18, M21, M23, M27, and M30 (not shown) operate over similar circuits, recording on tape T the digits "425" which is the office code of the office in which the line of station 2 is located.

Similarly, contacts of the register relays TH0 . . . TH9, H0 . . . H9, T0 . . . T9, and H0 . . . H9 of the identifier, which register the identified number of the calling line, are suitably connected to contacts of relay IAX to operate punch magnets of the recorder to record the identified calling-line number. For example, assuming the number of the line of station 2 to be "3457," relays TH3, H4, T5 and U7 are operated. Punch magnets M32, M33, M36, M39, M42, M44, M46 (not shown) and M50 then operate, recording on the tape T the number "3457." The circuit of punch magnet M50, for example, extends from battery through the winding of said magnet, conductor 112 within bracket 110, No. 35 contacts of relay IAX, conductor 113, and No. 2 contacts of relay U7 to ground. The other punch magnets mentioned above operate over similar circuits.

There is thus recorded on one line of tape T, the "type of entry" digit "4" indicating that the entry contains calling-line information, the trunk number "80," the office code "425" of the office in which the calling line is located, and the number "3457" of said calling line.

Contacts of the punch magnets M1 . . . M50 are interconnected in such a manner, as indicated in Fig. 6, that when two and only two of each group of five adjacent magnets are operated, the circuit of stepping magnet SM is completed from battery through the winding of said magnet and contacts of said punch magnets to ground. For example, punch magnets M1 and M4 being operated as previously described, said circuit is extended from battery through the winding of stepping magnet SM, front contacts of magnet M1, No. 1 back contacts of magnet M2, No. 1 back contacts of magnet M3, and No. 1 front contacts of magnet M4. Said circuit being completed, stepping magnet SM operates. However, if more than two of each group of five adjacent magnets is operated, said circuit is not completed and stepping magnet SM does not operate, preventing further operations until the correct number of punch magnets is operated.

Operation of stepping magnet SM connects ground through the contacts of said magnet to conductor 117 thence through No. 1 contacts of relay RA1, conductor 118, No. 4 contacts of relay IDE2, conductor 119 within bracket 103, and No. 4 contacts of relay IA to conductor 116 within bracket 92 to the identifier, causing said identifier to release relay IP1 which, in turn, releases relays IA and IAX, disconnecting the identifier from the trunk and from the recorder and releasing the punch magnets of the recorder operated by the identifier. The opening of No. 2 contacts of relay IA releases relay TKP1 and, in turn, relays RA1 and TKE, the latter relay releasing punch magnets of the recorder operated by it. The release of the punch magnets opens the circuit of and releases the stepping magnet SM, which moves the tape T to a position for punching a new line of characters.

The recorder is now free for the use of other trunks to record entries relating to other connections. With ground at No. 4 contacts of relay RA1 removed by the release of said relay, relay IDE2 operates in series with relay IDE1 over a circuit extending from battery through the winding of relay IDE1, winding of relay IDE2, No. 6 contacts of relay IDE1, conductor 120, and No. 1 contacts of relay SX to ground, preparing the trunk circuit for the next entry.

When registration in the sender of the called-line information has been completed, a preference relay associated with a sender, for example, relay SP1, operates over a circuit extending from battery over conductor 127, No. 59 contacts of relay ICA, conductor 128 within bracket 129, No. 11 contacts of relay CGA (said relay being operated), conductor 121, and winding of relay SP1 to ground.

Relay SC then operates over a circuit extending from battery through resistance R5, No. 4 back contacts of relays SP3 and SP2, No. 3 contacts of relays SP1, and winding of relay SC to ground. Relay TC also operates over a circuit from battery through the winding of said relay, conductor 122, and No. 4 contacts of relay TP to ground. Relay SCX then operates over a circuit extending from battery through the winding of said relay, No. 1 contacts of relay SC, No. 1 contacts of relay TC, conductor 123 within bracket 124, No. 3 contacts of relay IDE2, conductor 125, and No. 5 contacts of relay RA1 to ground, connecting the sender to the recorder.

Battery through resistance R3, No. 1 contacts of relay RCX, No. 2 contacts of relay SC, No. 2 contacts of relay TC, conductor 127 within bracket 124, No. 2 contacts of relay IDE2, conductor 102, and winding of relay TKP1 to ground operates relay TKP1. The No. 2 contacts of relay TKP1 complete the previously-traced circuit of relay RA1 which operates and, in turn, operates relay TKE. Relay SNE1 operates over a circuit from battery through the winding of said relay, No. 1 back contacts of relay SNE2, No. 1 front contacts of relay IDE2, conductor 106, and No. 4 contacts of relay RA1 to ground. Punch magnet M1 then operates over a circuit from battery through the winding of said punch magnet, conductor 107 and No. 1 contacts of relays TKE, DSE1 and ANE1 and No. 1 front contacts of relay SNE1 to ground, and punch magnet M3 operates over a circuit from battery through the winding of said punch magnet, conductor 126, No. 3 contacts of relays TKE, DSE1 and ANE1 and No. 3 front contacts of relay SNE1 to ground. These two punch magnets punch the "type of entry" character "2" in the tape, indicating that the characters following relate to the called-line information. The Nos. 6, 7, 8 and 9 contacts of relay TKE cause the operation of four other punch magnets to punch characters in the tape corresponding to the number of the trunk, in the manner previously described.

Other punch magnets also operate to record on the tape T, three digits corresponding to the office code dialed at calling station 2, reconstructed by the identifier, and registered on relays A0 . . . A7, B0 . . . B7, and C0 . . . C7 of the sender, as previously described. For example, if the first digit of said office code is "7," registered by the operation of relays A0 and A7, punch magnet M16 operates over a circuit extending from battery through the winding of said magnet, conductor 109 with bracket 110, No. 1 contacts of relay SCX, conductor 131 within bracket 130, and No. 6 contacts of relay A0 to ground and punch magnet M20 (not shown) operates over a similar circuit. Other punch magnets operate over similar circuits to record the two digits registered by relays B0 . . . B7, and C0 . . . C7, respectively.

Still other punch magnets of the recorder operate to record the digits of the number of the called station dialed at station 2 and registered by relays AR1 . . . AR6, BR1 . . . BR6, CR1 . . . CR6, DR1 . . . DR6, and ER1 . . . ER6 of the sender. For example, if the first digit of the number of the called station is "2" registered by the operation of relay AR2, punch magnet M31 (not shown) operates over a circuit extending over conductor 132 within bracket 110, No. 16 contacts of relay SCX, conductor 133 within bracket 134, No. 20 contacts of relay FTHB, conductor 135 within bracket 136, No. 12 back contacts of relay AR6, No. 9 front contacts of relay AR2, and No. 9 back contacts of relay AR1 to ground, and punch magnet M33 (not shown) operates over a similar circuit, recording the digit "2" on tape T of the recorder. Other punch magnets operate over similar circuits to record the remaining digits of the called-line number.

Operation of the punch magnets closes the circuit of stepping magnet SM through contacts of said punch magnets to ground, as previously described, operating said stepping magnet. A circuit is thereby completed from battery through the winding of relay RCX, No. 3 contacts of relays SC, No. 3 contacts of relay TC, conductor 137 within bracket 124, No. 3 back contact of relay SNE2, No. 4 front contact of relay IDE2, conductor 113, No. 1 contacts of relay RA1, conductor 1 7 and contacts of stepping magnet SM to ground, operating relay RCX which locks up through its No. 2 contacts and No. 5 contacts of relay TC to ground. At its No. 1 contacts, relay RCX opens the circuit, previously traced, of relay TKP1 releasing said relay and, in turn, relays RA1 and TKE, the operated punch magnets, and the stepping magnet SM, the latter causing tape to be advanced to a position for punching another row of characters. Release of relay RA1 releases relay TC and, in turn, relays RCX and SCX disconnecting the sender from the recorder and from the trunk. The recorder is now free to be used by other trunks for the recording of entries relating to other calls.

Relay SNE2 now operates in series with relay SNE1 over a circuit extending from battery through the winding of relay SNE1, winding of relay SNE2, No. 6 contacts of relay SNE1, conductor 120 and No. 1 front contact of relay SX to ground, preparing the trunk circuit for the next operation with the recorder.

When the connection of station 2 has been extended to the called station 20 by the sender in the usual manner, ground is connected at the terminating office 24 to conductor 143 thence, through No. 4 front contacts of relay TR and trunk finder circuit 15, to conductor 88. Relay IC then operates to close its upper contacts and open its lower contacts over a circuit from battery through resistance R2, No. 1 contacts of relay SLV, conductor 89, and the windings of relay IC to ground on conductor 88, in parallel with resistance R1 in a circuit through the No. 2 contacts of relay SLV, resistance R1, conductor 90, and No. 1 contacts of relay D to ground. Relay CT then operates over an obvious circuit through No. 1 contacts of relay IC, and locks up through its No. 7 contacts, conductor 138 and No. 4 contacts of relay SX to ground. The No. 6 contacts of relay CT complete a holding circuit for relay IC. The No. 1 contacts of relay CT complete a circuit from battery through the winding of the release magnet RLS of switch DS, conductor 140, No. 3 contacts of relay B, conductor 141, No. 1 contacts of relay CT, conductor 68, No. 1 contacts of off-normal contacts DON of switch DS, conductor 69, and No. 2 contacts of relay D to ground, operating release magnet RLS which returns the brush of switch DS to its normal position. The No. 2 and No. 13 contacts of relay CT close through the tip conductor 52 and ring conductor 53 from the calling station 2 to the left-hand windings of repeating coil C2. The No. 5 and No. 10 contacts of relay CT close through the right-hand windings of coil C2 to the tip conductor 142 and the ring conductor 143 of the trunk through the terminating office 24 to the called station 20, permitting conversation between the calling and the called stations.

Relay S operates over a circuit extending from battery through the upper winding of said relay, No. 1 back contacts of relay NT, conductor 144, lower left-hand winding of coil C2, No. 13 front contacts of relay CT, conductor 53 extended through selectors 12 and 9, and line-finder 6, switchhook of subscriber's station 2, the tip conductor of the line of station 2 extended through line-finder 6 and selectors 9 and 12 to conductor 52, No. 2 contacts of relay CT, upper left-hand winding of coil C2, conductor 145, No. 3 back contacts of relay NT, and lower winding of relay S to ground. The No. 9 contacts of relay CT open the holding circuit of relay SX but the latter relay is held operated over a circuit extending from battery through the winding of said relay, contacts of relay S, conductor 146 and No. 4 contacts of relay CT to ground.

When the called party answers by removal of the receiver at station 20 from the switchhook, reversed battery is applied to the trunk at the terminating office 24, battery being connected to ring conductor 143 and ground to tip conductor 142. Polarized relay CS then operates over a circuit from battery on ring conductor 143, No. 10 contacts of relay CT, the lower right-hand winding of coil C2, No. 1 contacts of relay NN, conductor 147, No. 1 contacts of relay PB, conductor 148, the two windings of relay CS in series, upper right-hand winding of coil C2, and No. 5 contacts of relay CT, to ground on conductor 142. The left-hand contacts of relay CS are thereby closed and relay RV operates over an obvious circuit. The No. 1 contacts of relay RV open the circuit of relay TR, which releases. When interrupter INT closes its left-hand contacts, relay I operates over a circuit extending from battery through the lower winding of said relay, No. 4 contacts of relay D, conductor 150, No. 5 contacts of relay RV, conductor 151, No. 1 normal contacts of relay I, and left-hand contacts of interrupter INT to ground, and locks up through its No. 1 front contacts to ground. After a two-second delay, interrupter INT closes its right-hand contacts. Relay CH then operates over a circuit extending from battery through the winding and No. 5 normal contacts of said relay, conductor 152, No. 2 contacts of relay SX, conductor 153, No. 2 contacts of relay I, and right-hand contacts of interrupter INT to ground, and locks up through its own No. 5 front contacts, conductor 154, No. 4 back contacts of relay NT, conductor 155 and No. 1 normal contacts of relay TR to ground.

Relay TKP1 now operates over a circuit extending from battery through the No. 4 contacts of relay CH, No. 2 contacts of relay RC, conductor 156, No. 2 contacts of relays ANE2, SNE2, and IDE2, conductor 102, and winding of relay TKP1, to ground, and causes the operation of relays RA1 and TKE in the manner previously described. Relay ANE1 operates over a circuit extending from battery through the winding of said relay, No. 1 back contacts of relay ANE2, No. 1 front contacts of relays SNE2, and IDE2, conductor 106, and No. 4 contacts of relay RA1 to ground. Punch magnet M1 operates from battery through the winding of said punch magnet, conductor 107, No. 1 contacts of relay TKE, No. 1 back contacts of relay DSE1 and No. 1 front contacts of relay ANE1 to ground, and punch magnet M2 operates from battery through the winding of said punch magnet, conductor 157, No. 2 contacts of relay TKE, No. 2 contacts of relay DSE1, and No. 2 front contacts of relay ANE1 to ground. The two operated punch magnets record on the tape the "type of entry" digit "1," indicating that the entry refers to the beginning of conversation time of a call. Other punch magnets operate through the Nos. 6, 7, 8 and 9 contacts of relay TKE, as previously described, to punch in the tape characters corresponding to the number of the trunk. Operation of relay ANE1 also closes a circuit from ground through No. 6 contacts of relay RA1, conductor 161, No. 8 contacts of relay ANE1 and conductor 162 to a day and hour circuit 25, which may be of any suitable well-known type, causing said day and hour circuit to ground two conductors in each of two groups of five conductors in brackets 163 and 164 which are connected respectively to the windings of punch magnets M16 to M20 and M21 to M25, causing the operation of two in each of said groups of punch magnets to punch in the tape two characters indicative of the six-second interval of the current ten-minute period as measured by said day and hour circuit.

The recording, when the called party answers, of the entry described above, is necessary in order to determine from the record, whether or not the call was completed, since, if such entry appears on the record, it is evident that the call was completed while if the expected entry is missing, it may be assumed that the call was not completed and no charge should be made for the call. However, the inclusion in said entry of the indication of time, described above, is only necessary if charges are to be computed in accordance with the length of conversation time. If such is not the case, the day and hour circuit need not be used and the time indication may be omitted from the entry.

Assuming the entry is made as described above, when the punch magnets have operated, a circuit is completed from battery through the winding of stepping magnet SM, the chain contacts of the operated punch magnets, conductor 160 and No. 7 contacts of relay ANE1 to ground, operating said stepping magnet. Relay RC then operates over a circuit extending from battery through the winding of said relay, conductor 165, No. 3 front contacts of relay SNE2, No. 4 front contacts of relay IDE2, conductor 118, No. 1 contacts of relay RA1, conductor 117, and contacts of stepping magnet SM to ground. The No. 2 contacts of relay RC open the circuit previously traced, of relay TKP1, releasing said relay which releases relay RA1 and, in turn, relays TKE and RC, the operated punch magnets, and stepping magnet SM. Release of the stepping magnet shifts the tape T to the position for punching a new line of characters. The recorder is now free to be used by other trunks for the recording of entries relating to other calls.

Relay ANE2 then operates in series with relay ANE1 over a circuit extending from battery through the winding of relay ANE1, the winding of relay ANE2, No. 6 contacts of relay ANE1, conductor 120, and No. 7 contacts of relay CH to ground, preparing the trunk circuit for the next recording operation.

When the called party replaces the receiver at station 20 at the termination of the conversation, if the receiver at station 2 has not been replaced, the before-mentioned battery and ground at the terminating office 24 on conductors 143 and 142 is removed, releasing relay CS which, in turn, releases relay RV. Relay TKP1 then operates over a circuit extending from battery through No. 6 contacts of relay RV, conductor 166, No. 1 contacts of relay RC, conductor 167, No. 3 contacts of relay DSE2, No. 2 front contacts of relay ANE2, No. 2 contacts of relay SNE2, No. 2 contacts of relay IDE2, conductor 102, and winding of relay TKP1 to ground, operating relay RA1 and, in turn, relay TKE. Punch magnet M1 operates over a circuit from battery through the winding of said punch magnet, conductor 107, No. 1 contacts of relay TKE, and No. 1 front contacts of relay DSE1 to ground and punch magnet M5 operates over a circuit from battery through the winding of said punch magnet, conductor 168, No. 5 contacts of relay TKE, and No. 5 front contacts of relay DSE1 to ground. The two operated punch magnets record on the tape the "type of entry" digit "7," indicating that the entry refers to the termination of a call. Other punch magnets are operated through Nos. 6, 7, 8 and 9 contacts of relay TKE to punch in the tape characters corresponding to the number of the trunk, and by the day and hour circuit 22 to punch characters indicating the six-second interval of the current ten-minute period, as previously described.

When the circuit of stepping magnet SM is closed through the contacts of the operated punch magnets and conductor 160 to ground at No. 7 contacts of relay ANE1, said stepping magnet operates, operating relay RC, as previously described, which releases relay RA1 and, in turn, relays RC and TKE and the operated punch magnets. Relay DSE2 now operates in series with relay DSE1 over a circuit extending from battery through the winding of relay DSE1, winding of relay DSE2, and No. 6 contacts of relay DSE1 to the previously traced ground on conductor 120. Relay TR then operates over a circuit extending from battery through the winding of said relay, conductor 65, No. 1 contacts of relay RV, conductor 66, No. 1 contacts of relay C, conductor 67, and No. 2 contacts of relay DSE2 to ground. The No. 1 contacts of relay TR open the circuit of and release relay CH.

If the calling party at station 2 replaces his receiver before the called party at station 20 does so, relay S is released by the opening of its circuit, previously traced, at the switchhook contacts of the calling station 2, releasing relay SX, which removes ground at its No. 1 contacts from conductor 120. Ground is still maintained on conductor 120, however, through No. 7 contacts of relay CH, holding operated relays IDE1, IDE2, SNE1, SNE2, ANE1, and ANE2. Release of relay SX disconnects, at its No. 6 contacts, the ground at No. 6 contacts of relay D from sleeve conductor 59, causing selectors 9 and 12 to release and disconnect the calling station 2 from the trunk. The No. 4 contacts of relay SX open the holding circuit of relay CT, releasing said relay which opens the circuits of the trunk to coil C2, releasing relay CS which, in turn, releases relay RV. Relay D operates over a circuit extending from battery through the upper winding of said relay, No. 8 contacts of relay CH, conductor 170, No. 6 contacts of relay SLV, conductor 171, No. 10 contacts of relay TP, conductor 172, and No. 3 contacts of relay SX to ground. Relay PB also operates over a circuit extending from battery through the winding of said relay, conductor 173, and No. 3 contacts of relay D, thence over the operating path of relay D, traced above, to ground. Relay PB applies ground at its No. 6 front contacts to conductor 58 thence through coil C1 to sleeve conductor 59, maintaining the trunk busy until the completion of recording operations. Relay PB is made slow operating to give time for selectors 9 and 12 to release.

Relay TKP1 now operates over a circuit extending from battery through No. 7 contacts of relay SX, conductor 166, No. 1 contacts of relay RC, conductor 167, No. 3 contacts of relay DSE2, No. 2 contacts of relays ANE2, SNE2, and IDE2, and the winding of relay TKP1 to ground. Recording of the time of the end of conversation and release of the operated relays then take place as previously described. Relay D is released by the release of relay CH, releasing in turn relay PB.

The foregoing description has been confined to the recording of information in connection with a call made over one trunk. It will be understood, however, that information relating to calls made over other trunks not shown is recorded on the tape of the recorder in the same manner, the entries relating to various calls being interspersed on said tape.

At some set hour, such as midnight each day, the day and hour circuit 25 grounds the appropriate conductors within bracket 174 to punch magnets M1 . . . M15 of the recorder, operating a combination of said magnets to punch in the tape three characters indicative of the day of the year. Every ten minutes thereafter the day and hour circuit grounds the appropriate combination of said conductors to punch in the tape three characters indicative of the ten-minute period of the day. The day and hour circuit also grounds conductor 175, and, upon operation of the punch magnets, said ground is extended through the contacts of punch magnets M1 . . . M15 to the winding of stepping magnet SM, operating said stepping magnet. Upon removal of said ground in the day and hour circuit, the stepping magnet releases, moving the tape to a position for punching a new line of characters.

The recording operations under the control of the day and hour circuit as described above are dependent, however, on the ground at No. 10 contacts of relay TKE being connected to the day and hour circuit over conductor 176. If relay TKE, or any similar relay associated with another trunk, is operated, indicating that the recorder is in use, this circuit will be open and the time recording operations described will await release of said operated relay.

The recording on the common tape T of periodic indications of current time, as described above, reduces the amount of information which it is necessary to record in answer and disconnect entires and enables the date and approximate time of other entries to be determined. However, it is evident that sufficient information may be recorded in the answer and disconnect entries in the manner already described, to enable the length of conversation time on each call to be determined without the periodic time entries, while if charges for the calls are not computed in accordance with the length of conversation time, the entries controlled by the day and hour circuit are not required.

While I have illustrated my invention in its application to a particular type of telephone system, it should be understood that it is not limited to such application or to the specific arrangements herein disclosed, it being apparent to one skilled in the art that various applications, modifications, and arrangements other than those disclosed herein, are within the scope of the invention. The terms and expressions which I have employed in reference to the invention and its elements are used as terms of description and not of limitation and I have no intention in the use of such terms and expressions of excluding thereby equivalents of the features shown and described or portions thereof, but, on the contrary, intend to include therein any and all equivalents and modifications which may be employed without departing from the spirit of the invention.

What is claimed is:

1. In a telephone system adapted for recording on a common medium items of record information pertaining to telephone connections established between calling lines and called lines over step-by-step switching selectors and trunks, each of said lines and each of said trunks having an identifying designation, the combination with an identifier for determining the identity of each of said calling lines during the establishment of said connections, means responsive to impulses from said calling lines for extending said lines severally to said trunks over said switching selectors, means for determining for each connection the number of impulses utilized at each switching selector for extending a calling line therethrough to one of said trunks, register senders responsive to said impulse determining means and to impulses transmitted thereto from said calling lines for controlling the establishment of said connections from said trunks to said called lines, and a trunk register settable at times in response to the designation of each of said trunks, of a recorder and a common recording medium therefor operatively connectable at times with each of said trunks, with said identifier, with said trunk register and with each of said senders for recording on separate lines of said recording medium for each of said connections the identified designation of the calling line connected to a trunk, the designation of said trunk and an arbitrary designation; for recording on other lines of said recording medium for each of said connections the designation of the called line thereof, the designation of the trunk and an arbitrary designation different from the arbitrary designation recorded on the lines containing the designations of said calling lines, and for recording on two other lines for each of said connections and in response, respectively, to the beginning and termination of conversation thereover an indication of the time when said conversation began and an indication of the time when said conversation terminated, including for each of said lines an arbitrary designation, each of which is different from each other and from the arbitrary designation recorded on each of the two first lines for each of said connections.

2. In an automatic recording telephone system, in combination with a calling line, a called line, and a trunk, each of said lines and said trunk having an identifying designation, step-by-step switching selectors, means responsive to signals from said calling line for extending said calling line to said trunk over said switching selectors, a trunk register settable in response to the extension of said calling line to said trunk for registering in said trunk register the designation of said trunk, means responsive subsequent to the extension of said calling line to said trunk for determining said signals, an identifier operative upon the extension of said calling line to said trunk for determining the identifying designation of said calling line, said identifier including means responsive to said signaling determining means for determining the route over which to further extend the connection from said trunk to said called line, a register sender, means responsive to the connection of said calling line to said trunk for connecting said register sender to said trunk and to said identifier, said register sender including a first register settable in response to said route determining means, a second register settable in response to signals transmitted from said calling line indicative of the designation of said called line, means responsive to said first and second register for extending said trunk to said called line over the route indicated by said route determining means; a recorder including a record medium therefor, means for connecting said recorder to said identifier and to said trunk register and responsive to the operation of both for recording on one line of said record medium the designation of said calling line, the designation of said trunk and a first arbitrary designation, means responsive to the operation of said recorder and to said sender subsequent to the setting of said first and second registers therein for connecting said recorder to said registers and to said trunk register, thereby to record on a second line of said record medium the designation of said called line, the designation of said trunk and a second arbitrary designation, time-determining means, means responsive to said called line answering for connecting said recorder to said trunk register and to said time-determining means for recording on a third line of said record medium the designation of said trunk, the indication of the time when said called line answered and a third arbitrary designation, means responsive to said calling line restoring for again connecting said recorder to said trunk register and to said time-determining means for recording the designation of said trunk the indication of the time when said connection terminated, and a third arbitrary designation, current time indicating means, and means under the control of said trunk register when operated for periodically connecting said current time indicating means to said recorder, thereby to operate said recorder to record on said record medium the current time indication of each connection of said current time indicating means to said recorder.

FREDERICK J. SCUDDER.

REFERENCES CITED

The following references are of record in the file of this patent:

UNITED STATES PATENTS

| Number | Name | Date |
|---|---|---|
| 2,112,951 | Carpenter et al. | Apr. 5, 1938 |
| 2,165,924 | Goodrum | July 11, 1939 |
| 2,180,824 | Hatton et al. | Nov. 21, 1939 |
| 2,297,365 | Ostline | Sept. 29, 1942 |
| 2,447,533 | Retallack | Aug. 24, 1948 |